(12) United States Patent
Gottehrer

(10) Patent No.: US 12,403,889 B2
(45) Date of Patent: Sep. 2, 2025

(54) SYSTEMS AND METHODS FOR ASSIGNING VEHICLES TO TRANSPORTATION REQUESTS

(71) Applicant: Jonathan Gottehrer, Massapequa, NY (US)

(72) Inventor: Jonathan Gottehrer, Massapequa, NY (US)

( * ) Notice: Subject to any disclaimer, the term of this patent is extended or adjusted under 35 U.S.C. 154(b) by 94 days.

(21) Appl. No.: 17/143,123

(22) Filed: Jan. 6, 2021

(65) Prior Publication Data

US 2021/0155221 A1 May 27, 2021

Related U.S. Application Data

(60) Provisional application No. 62/959,171, filed on Jan. 9, 2020.

(51) Int. Cl.
| | |
|---|---|
| *B60W 20/13* | (2016.01) |
| *B60W 20/30* | (2016.01) |
| *B60W 20/40* | (2016.01) |
| *G01C 21/34* | (2006.01) |
| *G01C 21/36* | (2006.01) |

(52) U.S. Cl.
CPC ............ *B60W 20/13* (2016.01); *B60W 20/30* (2013.01); *B60W 20/40* (2013.01); *G01C 21/3469* (2013.01); *G01C 21/3605* (2013.01)

(58) Field of Classification Search
CPC ...... B60W 20/13; B60W 20/30; B60W 20/40; G01C 21/3469; G01C 21/3605
See application file for complete search history.

(56) References Cited

U.S. PATENT DOCUMENTS

| | | | | |
|---|---|---|---|---|
| 2017/0343366 | A1* | 11/2017 | You | G01C 21/343 |
| 2018/0045533 | A1* | 2/2018 | Jackson | G01C 21/3682 |
| 2018/0315146 | A1* | 11/2018 | Matthiesen | G08G 1/096844 |
| 2018/0322775 | A1* | 11/2018 | Chase | G06N 5/022 |
| 2020/0104965 | A1* | 4/2020 | Ramot | G08G 1/202 |
| 2020/0312153 | A1* | 10/2020 | Thakur | G05D 1/227 |
| 2021/0310818 | A1* | 10/2021 | Kim | B60L 58/13 |

OTHER PUBLICATIONS

Merriam-Webster, "dispatch," 2009 (Year: 2009).*

* cited by examiner

*Primary Examiner* — Aniss Chad
*Assistant Examiner* — Stephanie T Su
(74) *Attorney, Agent, or Firm* — Collard & Roe, P.C.; William Collard

(57) ABSTRACT

Systems and methods for assigning vehicles to transportation requests in transportation network platforms are disclosed, wherein a vehicle is determined to have a sufficient range to fulfill a transportation request prior to an assignment to the transportation request. In some implementations, vehicles determined to have a sufficient range to fulfill a transportation request may be determined to require refueling, and may be assigned to a transportation request, wherein a vehicle refueling event is planned in conjunction with the vehicle assignment. Vehicles may be selected for determinations for vehicle assignment, wherein such selection is based on a proximity to a pickup location of a transportation request. In some implementations, if no vehicles within the proximity are determined to have a sufficient range, then the proximity is a first proximity and a next proximity having a greater distance than the first proximity is used to select vehicles for determinations for vehicle assignments.

18 Claims, 12 Drawing Sheets

| Transportation Table 300 | |
|---|---|
| PK 301 | transportation_id |
| FK 302 | customer(customer_id) |
| 303 | request_date_time |
| FK 304 | cust_loc_at_rt(location_id) |
| FK 305 | req_dest(location_id) |
| FK 306 | req_pickup_loc(location_id) |
| 307 | req_pickup_time |
| FK 308 | req_service(service_id) |
| FK 309 | route(route_id) |
| 310 | fare_quote |
| FK 311 | pickup_loc_quote(location_id) |
| 312 | pickup_time_quote |
| FK 313 | dest_quote(location_id) |
| FK 314 | service_quote(service_id) |
| FK 315 | tran_srvc_evnt(status_code_id) |
| FK 316 | d-v(driver-vehicle_id) |
| FK 317 | d-v_loc_at_asgmt(location_id) |
| 318 | fuel_status_at_asgmt |
| 319 | range_at_asgmt |
| FK 320 | refuel_evnt_plan(fuel_unit_id) |
| 321 | refuel_amount_min |
| FK 322 | pickup_loc_actual(location_id) |
| 323 | pickup_time_actual |
| FK 324 | route_actual(route_id) |
| FK 325 | dest_actual(location_id) |
| 326 | fare_actual |
| FK 327 | refuel_unit_actual(fuel_unit_id) |
| 328 | refuel_amount_actual |
| 329 | fuel_status_at_refuel_evnt |
| 330 | range_at_refuel_evnt |

FIG. 3A

| Location Table 340 | |
|---|---|
| PK 341 | location_id |
| 342 | coordinates |
| 343 | address |
| 344 | venue_name |
| 345 | restrictions |
| 346 | instructions |
| FK 347 | spec_pickup_loc(location_id) |
| FK 348 | spec_drop_off_loc(location_id) |
| FK 349 | alt_loc(location_id) |

FIG. 3B

| Driver-Vehicle Table 360 | |
|---|---|
| PK 361 | driver-vehicle_id |
| FK 362 | driver(driver_id) |
| FK 363 | vehicle(vehicle_id) |
| 364 | fuel_type |
| FK 365 | veh_service_type(service_id) |
| 366 | vehicle_availability |
| FK 367 | vehicle_location(location_id) |
| 368 | fuel_status |
| 369 | range_status |
| 370 | fuel_range_conversion |
| FK 371 | pref_fuel_unit(fuel_unit_id) |
| FK 372 | refuel_evnt(status_code_id) |

FIG. 3C

| Fuel Unit Table 380 | |
|---|---|
| PK 381 | fuel_unit_id |
| FK 382 | fuel_unit_loc(location_id) |
| FK 383 | fuel_srvcs(fuel_services_id) |
| FK 384 | fuel_oper(fuel_operator_id) |
| 385 | fuel_unit(status_code_id) |
| FK 386 | facility(facility_id) |
| 387 | local_unit_number |

FIG. 3D

| Range and Proximity Table 390 | |
|---|---|
| PK 391 | range_proximity_id |
| FK 392 | geographic_zone(location_id) |
| FK 393 | time_day(day_part_id) |
| 394 | range_margin |
| 395 | min_rmng_range |
| 396 | proximity_distance_limit |
| 397 | proximity_distance_increment |

FIG. 3E

SYSTEMS AND METHODS FOR ASSIGNING VEHICLES TO TRANSPORTATION REQUESTS

CROSS-REFERENCE TO RELATED APPLICATIONS

This application claims the benefit of U.S. Provisional Application No. 62/959,171, filed Jan. 9, 2020, entitled ELECTRIC FHV ON-DEMAND PLATFORM FOR PASSENGER AND ROUTE CHARGING OPTIMIZATION, which is incorporated by reference herein in its entirety.

FIELD OF THE DISCLOSURE

The present disclosure relates to transportation network platforms, and more specifically relates to systems and methods for assigning vehicles to transportation requests.

SUMMARY

Various implementations of a transportation network platform are disclosed wherein a vehicle assignment to a transportation request may be made at least in part based on a fuel status and/or a range of a vehicle, such as for example a level of battery charge and/or a remaining distance an electric vehicle can travel. In some implementations, a vehicle assignment to a transportation request may be made based at least in part on the vehicle having been determined to comprise a sufficient range to fulfill the transportation request. In some implementations, a vehicle assignment to a transportation request may be made based at least in part on the vehicle having been determined to comprise a sufficient range to fulfill the transportation request and the vehicle having a proximity that is within a given distance to a pickup location of the transportation request. In some implementations, a vehicle assignment to a transportation request may be made based at least in part on the vehicle having been determined to comprise a sufficient range to fulfill the transportation request and the vehicle having a proximity that is closer to a pickup location of the transportation request and/or the vehicle having an earlier estimated time of arrival to the pickup location of the transportation request relative to proximities and/or times thereto of other vehicles determined to comprise a sufficient range to fulfill the transportation request.

In some implementations, vehicles may be selected for a determination of sufficient range based at least in part on a criteria specified in a transportation request, such as but not limited to, a pickup location and/or a service type, wherein for example, a selection of vehicles for a determination of sufficient range may be limited to those vehicles that are within a given proximity to the pickup location and/or those vehicles meeting a specified service type. In some implementations, a selection of vehicles for a determination of sufficient range may be a first selection of vehicles that are within a first proximity of a pickup location of a transportation request, and if no vehicle assignment for the transportation request results from the first selection (e.g., no vehicles were found within the first proximity and/or one or more criteria specified in the transportation request excluded all vehicles from the first selection), then a next selection of vehicles within a next proximity of the pickup location may be made, wherein the next proximity may be a greater distance from the pickup location than the first proximity.

In some implementations, a vehicle assignment may be made at least in part based on a facilitation of a vehicle refueling event. In some implementations, a vehicle refueling event, such as for example a charging of an electric vehicle, may be planned in conjunction with a vehicle assignment to a transportation request. In some implementations, if one or more vehicles are determined to comprise a sufficient range to fulfill a transportation request, and one or more of those vehicles are determined to require refueling, then a vehicle from those vehicles requiring refueling may be given priority and assigned to the transportation request, and a vehicle refueling event, such as for example a charging of an electric vehicle, may be planned in conjunction with the vehicle assignment to a transportation request. In some implementations, a refueling event may be planned based at least in part on one or more criteria, such as but not limited to, a range of the vehicle, a range of the vehicle relative to one or more other vehicles, a fueling location, a fuel type, a fuel service ownership, a vehicle location, a pickup location of the transportation request, a destination location of the transportation request, vehicle route scenarios, an actual or estimated level of demand of transportation requests and/or a preference of a vehicle driver, a vehicle operator and/or a vehicle owner.

A vehicle may have a pending refueling event that was planned in conjunction with a prior vehicle assignment, and the pending refueling event may not have been satisfied at the time a determination of sufficient range is made for consideration in another vehicle assignment. In some implementations, a vehicle having a pending refueling event that has not been satisfied may be given a lower priority to a vehicle assignment than those vehicles not having a pending refueling event, wherein for a group of vehicles determined to comprise a sufficient range to fulfill a transportation request, a priority for assignment to the transportation request may be given as such: a first priority may be given to those vehicles requiring refueling and not having a pending refueling event; a second priority may be given to those vehicles not requiring refueling (and not having a pending refueling event, however this may be implied as they do not require refueling); and a third priority may be given to those vehicles having a pending refueling event. When on average, vehicles engaged to provide services in a transportation network platform are assumed to complete 25 or more vehicle assignments prior to requiring refueling, a probability of a vehicle being given a first priority due to its requiring refueling and not having a pending refueling event, may generally be thought to be less than a five percent probability. A number of vehicles occurring in the class receiving a third priority may generally be far less frequent than vehicles meeting the second priority class, wherein this may be due to the number of vehicle assignments that are generally completed prior to a refueling being required, drivers being compelled to avoid running out of fuel and therefore completing a scheduled refueling event as soon as possible, and drivers generally being informed of the aforementioned priority schedule and wishing to maintain a more favorable probability for vehicle assignments by completing a scheduled refueling event as soon as possible. A priority within a second priority class may be given to a vehicle having a closest proximity to the pickup location and/or an earliest estimated time of arrival to the pickup location. As a result, an assumption may be made that for over 90 percent of the vehicle assignments, an assignment results in a service response time as short as is generally available. When an assignment is made to those priority classes requiring refueling, namely the first and third priority classes, a priority for assignment within each of those classes can be given to the vehicle comprising the shortest vehicle range, thereby reducing a probability that a vehicle presently engaged in providing services will become unavailable to provide such services due to fuel depletion.

In some implementations, vehicles engaged to provide services in a transportation network platform of the present disclosure may include vehicles from one or more fuel types. For example, a transportation network platform may have vehicles from one or more fuel types, such as but not limited to, electric vehicles, gasoline vehicles, diesel vehicles, hybrid electric vehicles, plugin hybrid electric vehicles, solar electric vehicles, ethanol vehicles, biodiesel vehicles, propane vehicles, compressed natural gas (CNG) vehicles and/or hydrogen vehicles. In some implementations, vehicles engaged to provide services in a transportation network platform of the present disclosure may be all of one fuel type, such as for example but not limited to, all electric vehicles, all plugin hybrids electric vehicles or all of one of the other aforementioned fuel types. In some implementations, vehicles engaged to provide services in a transportation network platform of the present disclosure may be ground based vehicles, such as but not limited to cars, vans, buses, unmanned ground vehicles/drones and/or trucks, and/or may be aerial vehicles (or air vehicles), such as but not limited to helicopters, unmanned air vehicles/drones, personal air vehicles and/or airplanes. In some implementations, vehicles engaged to provide services in a transportation network platform of the present disclosure may be autonomous vehicles, in-vehicle operator vehicles, and/or remotely operated vehicles.

In some implementations, a transportation network platform may assign vehicles a transportation request based at least in part on the vehicle having been determined to comprise a sufficient range to fulfill the transportation request, wherein the transportation request may comprise package delivery, food delivery, cargo delivery and/or another delivery service which may or may not comprise one or more passengers.

The possible and illustrative implementations disclosed herein should not be construed as an exhaustive list of possible and illustrative implementations. Rather the various implementations presented serve to illustrate only some of the various ways to practice the invention and many additional combinations of features and configurations are possible within the scope of the invention disclosed herein.

BRIEF DESCRIPTION OF THE SEVERAL VIEWS OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter.

FIG. 3A depicts an example database table comprising example transportation records comprised by the system of FIG. 1A.

FIG. 3B depicts an example database table comprising example location records comprised by the system of FIG. 1A.

FIG. 3C depicts an example database table comprising example driver-vehicle records comprised by the system of FIG. 1A.

FIG. 3D depicts an example database table comprising example fuel unit records comprised by the system of FIG. 1A.

FIG. 3E depicts an example database table comprising example range and proximity records comprised by the system of FIG. 1A.

DETAILED DESCRIPTION

Figure 1A:
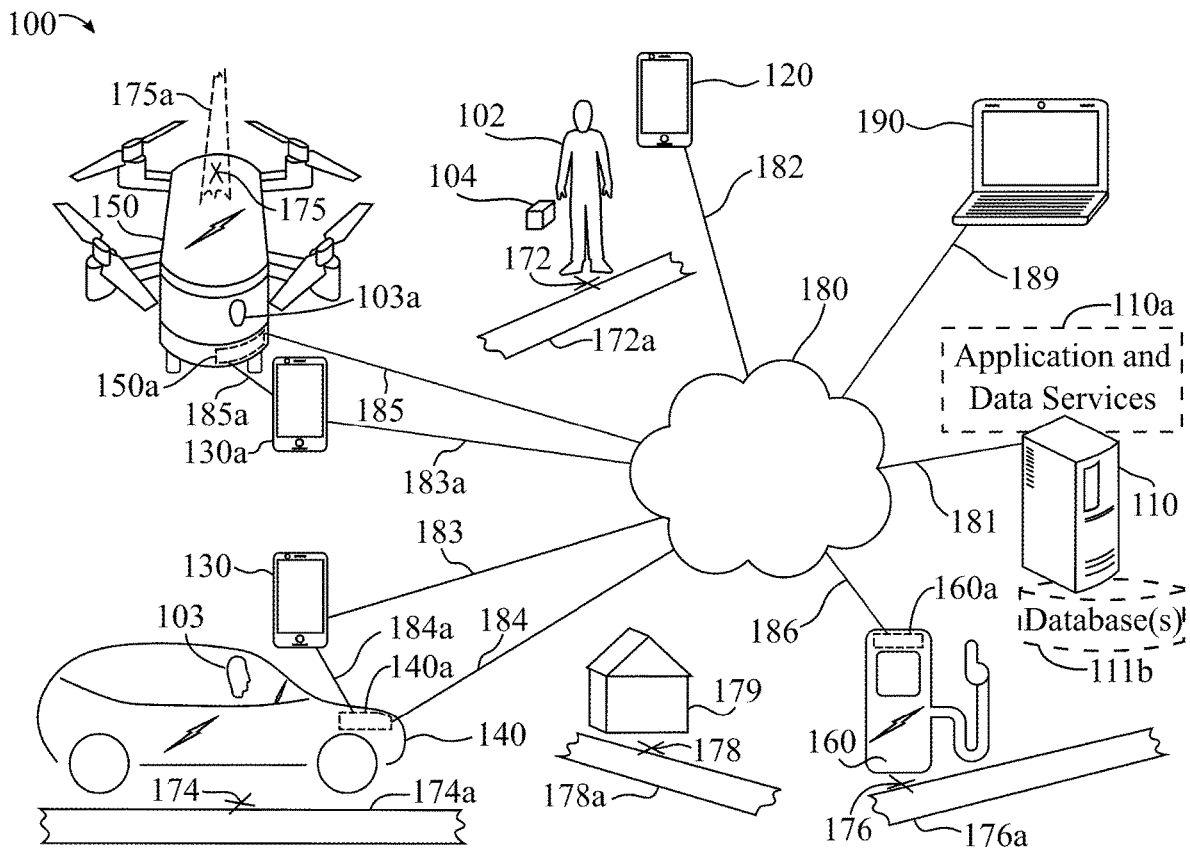
FIG. 1A depicts a system diagram of an example implementation of a transportation network platform.

Various example implementations of systems and methods for assigning vehicles to transportation requests based at least in part on fuel statuses and/or ranges of vehicles are disclosed herein; however, it is to be understood that the disclosed implementations are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements.

In the present application, implementations of systems and methods in transportation network platforms are disclosed which may assign a vehicle to a transportation request at least in part based on a fuel status and/or a range of a vehicle, such as for example, a 20% level of battery charge, a half a tank of gas, a quarter level of battery charge, a vehicle range of 42 miles, a vehicle range of 80 kilometers, etc. Note that "vehicle range" and "range of a vehicle", herein the present disclosure, means a distance a vehicle of a current fuel status can travel prior to fully depleting the vehicle's fuel provision and/or necessitating an intervening refueling, and a fuel status may be a "value relating a range of a vehicle" or a "value relating a vehicle range", wherein a fuel status may be or include a fuel level or current capacity level which may be converted to a vehicle range, such as a range given in units of distance (e.g. miles, kilometers, etc.) relating the vehicle range. Methods and systems disclosed herein may prevent an assignment of a vehicle to a transportation request where the vehicle may not have a sufficient fuel status and/or vehicle range to fulfill such an assigned transportation request prior to fully depleting the vehicle's fuel provision and/or necessitating an intervening refueling in order to fulfill the assigned transportation request.

In some implementations, a vehicle refueling event, such as for example a charging of an electric vehicle, may be facilitated in conjunction with a vehicle assignment to a transportation request, wherein a vehicle having a given level of fuel depletion or marginal range may, upon completion of the vehicle assignment, be within a proximity of, and/or reachable distance from, a suitable, specified and/or preferred fueling location. In some implementations, a vehicle refueling event, such as for example a charging of an electric vehicle, may be planned in conjunction with a vehicle assignment to a transportation request, and planned based at least in part on one or more criteria, such as but not limited to, a range of the vehicle, a range of the vehicle relative to one or more other vehicles, a fueling location, fuel type, fuel service ownership, a vehicle location, a pickup location of the transportation request, a destination location of the transportation request, vehicle route scenarios, an actual or estimated level of demand of transportation requests and/or preference of a vehicle driver, a vehicle operator and/or a vehicle owner. In some implementations, a refueling event may be facilitated in conjunction with a vehicle assignment, wherein given an estimated time of completion and destination location of a transportation request of the vehicle assignment, the vehicle may upon completion of the vehicle assignment, be within a proximity of, and/or reachable distance to a preferred fueling location at or close to a preferred time. As an example, an estimated time of completion may be in a proximity to a desired end of work shift for a driver, and a destination location may be within a proximity of, and/or reachable distance to, a driver's home having a refueling capability or otherwise close to a preferred refueling location.

FIG. 1A depicts a system diagram of an example implementation of a transportation network platform 100 of the present disclosure, wherein transportation network platform 100 may facilitate transportation services for a plurality of customers. A customer 102 may use a customer device 120 to submit a transportation request to a server based system 110 via a communications link 182, a communications network 180 and a communications link 181. In some implementations, transportation network 100 may engage a plurality of drivers of ground vehicles. Server based system 110 may comprise application and data services 110a which may receive a transportation request and may create a vehicle assignment of a transportation request to a driver 103 of a ground vehicle 140, and thereby an assignment of vehicle 140 to the transportation request, wherein driver 103 may use a driver device such as driver device 130 to receive, confirm and/or accept such assignment via a communications link 183, a communications network 180 and a communications link 181. In some implementations, a driver device may be a component or device comprised by ground vehicle 140, such as a subsystem 140a, and driver device 130 as shown may not be needed to receive, confirm and/or accept a vehicle assignment, wherein such assignment may be communicated over communications link 184, communications network 180 and communications link 181 between server based system 110 and subsystem 140a.

In some implementations, transportation network 100 may engage a plurality of autonomous ground vehicles, and server based system 110 may create an assignment of a transportation request to an autonomous ground vehicle 140 (i.e., driver 103 as depicted may not be present in an autonomous ground vehicle 140), wherein server based system 110 may communicate with a subsystem 140a of an autonomous ground vehicle 140 via a communications link 184, a communications network 180 and a communications link 181. In some implementations, server based system 110 may communicate with a driver 103 via a driver device 130 via a communications link 183 to determine a ground vehicle 140 status, such as but not limited to a vehicle location, a fuel status, a vehicle range, etc. In some implementations, server based system 110 may communicate with a ground vehicle subsystem 140a via a communications link 184 to determine a ground vehicle 140 status, such as for example but not limited to, a vehicle location, a fuel status, a vehicle range, etc. In some implementations, server based system 110 may communicate with a ground vehicle subsystem 140a via a communications links 184a and 183, whereby driver device 130 relays such communications, to determine a ground vehicle 140 status, such as but not limited to a vehicle location, a fuel status, a vehicle range, etc. A customer 102 submitting a transportation request may be at a customer location 172 on a route 172a comprising customer location 172. Customer 102 may or may not have one or more parcels or items of cargo 104 (as shown) and/or may not be accompanied by one or more persons (not shown) which may or may not be included in a transportation request. A transportation request submitted by customer 102 may specify transportation from a customer location 172 or other pickup location (not shown) to a destination 179 and/or destination location 178 on a route 178a comprising destination 179 and/or destination location 178. In some implementations, a package delivery service, food delivery service, cargo delivery service and/or the like may be facilitated by transportation network platform 100, wherein customer 102 may not accompany or be transported as part of a delivery transportations service event. In some implementations, a transportation request may specify transportation for one or more passengers and/or one or more parcels/items of cargo to a destination 179 and/or destination location 178. Note, for brevity in the present disclosure, "customer and/or cargo" may be abbreviated as "customer/cargo" and may refer to various possible implementations wherein a package delivery service, a food delivery service, a cargo delivery service and/or the like, and/or a customer transportation service are facilitated in various combinations by transportation network platform 100. At the time of a transportation request, a driver 103 and a ground vehicle 140, or an autonomous ground vehicle 140, may be at a ground vehicle location 174 on a route 174a comprising ground vehicle location 174.

In some implementations, transportation network 100 may engage a plurality of drivers (pilots) of air vehicles. Application and data services 110a may receive a transportation request and may create a vehicle assignment of a transportation request to driver (pilot) 103*a* of an air vehicle 150, and thereby an assignment of vehicle 150 to the transportation request, wherein driver (pilot) 103*a* may use a driver device such as driver device 130*a* to receive, confirm and/or accept such assignment via a communications link 183*a*, a communications network 180 and a communications link 181. In some implementations, a driver device may be a component or device comprised by air vehicle 150, such as a subsystem 150*a*, and driver device 130*a* as shown may not be needed to receive, confirm and/or accept a vehicle assignment, wherein such assignment may be communicated over communications link 185, communications network 180 and communications link 181 between server based system 110 and subsystem 150*a*. In some implementations, transportation network 100 may engage a plurality of autonomous air vehicles, and server based system 110 may create an assignment of a transportation request to an autonomous air vehicle 150—i.e., driver (pilot) 103*a* as depicted may not be present in an autonomous air vehicle 150—wherein server based system 110 may communicate with a subsystem 150*a* of an autonomous air vehicle 150 via a communications link 185, a communications network 180 and a communications link 181. In some implementations, server based system 110 may communicate with a driver (pilot) 103*a* via a driver device 130*a* via a communications link 183*a* to determine an air vehicle 150 status, such as but not limited to a vehicle location, a fuel status, a vehicle range, etc. In some implementations, server based system 110 may communicate with an air vehicle subsystem 150*a* via a communications link 185 to determine an air vehicle 150 status, such as for example but not limited to, a vehicle location, a fuel status, a vehicle range, etc. In some implementations, server based system 110 may communicate with an air vehicle subsystem 150*a* via a communications links 185 and 183, whereby driver device 130*a* relays such communications, to determine an air vehicle 150 status, such as but not limited to a vehicle location, a fuel status, a vehicle range, etc. A customer 102 submitting a transportation request may be at a customer location 172 on a route 172*a* comprising customer location 172. Customer 102 may or may not have one or more items of cargo or parcels 104 (as shown) and/or may not be accompanied by one or more persons (not shown) which may or may not be included in a transportation request. At the time of a transportation request, a driver (pilot) 103*a* and an air vehicle 150, or an autonomous air vehicle 150, may be at an air vehicle location 175 on a route 175*a* comprising current air vehicle location 175.

In some implementations, application and data services 110*a* of server based system 110 may communicate with a subsystem 160*a* of a fuel unit 160 (or an intermediary—not shown—which may comprise and/or report a status of a fuel unit 160), wherein such communication may be via a communications link 186, a communication network 180 and a communications link 181. Fuel unit 186 may be at a fuel unit location 176 on a route 176*a* comprising fuel unit location 176. In some implementations, vehicles engaged to provide services in a transportation network platform of the present disclosure may include vehicles from two or more fuel types. For example, a transportation network platform may have vehicles from two or more fuel types, such as but not limited to, electric vehicles, gasoline vehicles and plugin hybrid electric vehicles. In some implementations, vehicles engaged to provide services in a transportation network platform of the present disclosure may be all of one fuel type, such as for example but not limited to all electric vehicles or all plugin hybrids. Various types of fuel units 160 may be comprised or engaged by transportation network 100, such that various fuel types and fueling interfaces (e.g. plug types and charging profiles for electric vehicles) which may be needed are available to vehicles engaged by transportation network 100.

In some implementations, transportation network 100 may engage a plurality of one or more various forms of transportation such as, but not limited to ground vehicles operated by a driver, autonomous ground vehicles, air vehicles operated by a driver (pilot) and autonomous air vehicles. An autonomous ground vehicle 140 may be at a ground vehicle location 174 of a route 174*a*, or a ground vehicle 140 operated by a driver 103 may be at a ground vehicle location 174 of a route 174*a*, and may be assigned to a transportation request by application and data services 110*a* of server based system 110, wherein the transportation request may be submitted by a customer 102 at a customer location 172 of a route 172*a*. An autonomous air vehicle 150 may be at an air vehicle location 175 of a route 175*a*, or an air vehicle 150 operated by a driver (pilot) 103*a* may be at an air vehicle location 175 of a route 175*a*, and may be assigned to a transportation request by application and data services 110*a* of server based system 110, wherein the transportation request may be submitted by a customer 102 at a location 172 of route 172*a*.

In some implementations, application and data services 110*a* of server based system 110 may facilitate a refueling event of an autonomous ground vehicle 140, or a ground vehicle 140 operated by driver 103, at a fuel unit 160 at a fuel unit location 176 of a route 176*a*, wherein the refueling event may be facilitated in conjunction with an assignment of the autonomous ground vehicle 140 or ground vehicle 140 (and driver 103) to a transportation request which may be submitted by a customer 102 at a location 172 of route 172*a*. In some implementations, application and data services 110*a* of server based system 110 may facilitate a refueling event of an autonomous air vehicle 150, or an air vehicle 150 operated by a driver (pilot) 103*a*, at a fuel unit 160 at a fuel unit location 176 of a route 176*a*, wherein the refueling event may be facilitated in conjunction with an assignment of the autonomous air vehicle 150 or air vehicle 150 (and driver-pilot-103*a*) to a transportation request which may be submitted by a customer 102 at a customer location 172 of route 172*a*.

In some implementations, transportation network platform 100 may comprise one or more operator devices, such as an operator device 190. Operator device 190 may be used by an operator of transportation network 100 to interact with and initiate or perform various procedures and operations on transportation network platform 100, wherein operator device 190 communicates with application and data services 110*a* of server based system 110 via a communications link 189, a communications network 180 and a communications link 181.

Communications network 180 and communications links 181, 182, 183,183*a*, 184, 184*a* 185, 185*a*, 186, and 189 may comprise one or more communication types and may comprise internet backbone communications (primarily, but not necessarily, limited to communications network 180) wireless communications (such as but not limited to, cellular internet communications in the case of wide area (WAN) network types, and Bluetooth communications and a wireless local area network (WLAN) capability, such as an IEEE 802.11 based WLAN (Wi-Fi), in the case of short range and local area network (LAN) types) wired communications (optical and electrical conducting forms of physical connectivity) (such as but not limited to, IEEE 802.3 Ethernet for local networking and internet connectivity and modem technologies, such a but not limited to Data Over Cable Service Interface Specification (DOC SIS) compatible modems usable with cable based physical connectivity for internet connectivity). Communications links 182, 183, 183*a* for portable devices such as customer device 120, driver device 130 and driver/pilot device 130*a* may typically, but not necessarily, be cellular internet communications. Communications links for vehicle subsystems to communications network 180, such as ground vehicle subsystem 140*a* communications link 184 and air vehicle subsystem 150*a* communications link 185 may typically, but not necessarily, be cellular internet communications. Communications links for vehicle subsystems to driver device 130/driver (pilot) device 130*a*, such as ground vehicle subsystem 140*a* communications link 184*a* and air vehicle subsystem 150*a* communications link 185*a* may typically, but not necessarily, be Bluetooth communications.

Server based system 110 may comprise one or more servers comprising application and data services 110*a* and one or more database(s) 111*b*, and may be maintained by transportation network 100 and/or one or more suppliers thereto, and/or may at least partially a cloud based system shared by a plurality of companies and/or users. Server based system 110, application and data services 110*a* and database(s) 111*b* may be configured as one or more systems, wherein none, some or all may be cloud based systems, and may be collocated in a common facility or may be located in a plurality of facilities and communicatively interconnected via communications network 180 and communications links such as communications link 181. Communications network 180 may enable interaction between server based system 110 and a plurality of devices, such as for example but not limited to, user devices 120, 130 and 130*a*, operator devices such as operator device 190, subsystems 140*a*, 150*a* and 160*a*, and other systems, such as for example but not limited to, financial transaction processors, fuel unit operators and map service providers.

Figure 1B:
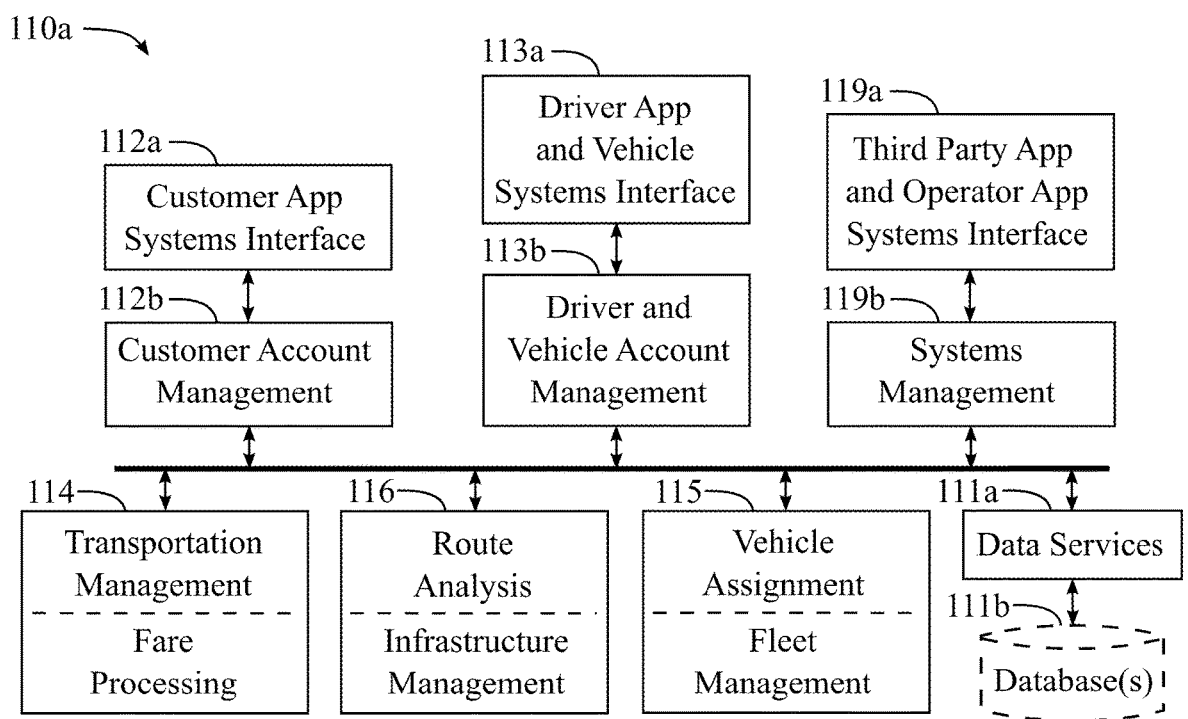
FIG. 1B depicts a software module diagram of an example software implementation of application and data services of a server based system of the system of FIG. 1A.

FIG. 1B depicts a software module diagram of an example software implementation of application and data services 110*a* of server based system 110 of transportation network platform 100, and illustrates an example organization of functions and services into application software modules and data services accessible via application system interface modules, such as, a customer application systems interface module 112*a*, a driver application and vehicle systems interface module 113*a* and a third party application and operator application systems interface module 119*a*. FIG. 1B depicts one of many possible ways to organize application software into various software modules and data services that may reside on one or more servers, devices, cloud-based systems or a combination thereof. In some implementations, application and data services 110*a* may comprise a data services module 111*a* comprising access to one or more databases 111*b*, a customer application systems interface module 112*a*, a customer account management module 112*b*, a driver application and vehicle systems interface module 113*a*, a driver and vehicle account management module 113*b*, a transportation management and fare processing module 114, a vehicle assignment and fleet management module 115, a route analysis and infrastructure management module 116, a third party application and operator application systems interface 119*a* and a systems management module 119*b*.

Customer account management module 112*b* may be accessed via customer application systems interface module 112*a*, which may comprise a data services interface, an application programming interface (API) and/or an application services interface that programmatically interacts with user devices of customers, such as customer device 120 of customer 102. Customer account management module 112*b* may comprise workflow and logic for management and use of customer accounts comprised by transportation network platform 100. Customer account management module 112*b* may comprise software instructions that when executed on at least one server comprised by server based system 110 may at least in part enable a customer 102 to perform various actions and operations, such as but not limited to: create a customer account; access a customer account and other customer related system functionality; edit a customer account; submit a transportation request; review a status of, or other information related to, a transportation request; cancel a transportation request; receive a transportation quote; confirm a transportation request; cancel a confirmed transportation request; monitor a transportation service event in progress; review a history of transportation service events facilitated by transportation network platform 100 and review expenditures related thereto; submit feedback related to a transportation service event or other aspect of interaction with the transportation network platform 100; etc. Data, such as data associated with customer accounts and transportation requests and events may be comprised by database(s) 111*b* and may be received, processed, generated and/or modified by customer account management module 112*b* in conjunction with data services module 111*a*.

Driver and vehicle account management module 113*b* may be accessed via driver application and vehicle systems interface module 113*a*, which may comprise a data services interface, an application programing interface (API) and/or an application services interface that programmatically interacts with user devices of drivers, such as driver device 130 of driver 103 or driver device 130*a* of driver (pilot) 130*a*, and/or vehicle systems of vehicle 140, such as subsystem 140*a*, and/or vehicle 150, such as subsystem 150*a*. Driver and vehicle account management module 113*b* may comprise workflow and logic for management and use of driver and vehicle accounts comprised by transportation network platform 100. Driver and vehicle account management module 113*b* may comprise software instructions that when executed on at least one server comprised by server based system 110 may at least in part enable a driver 103 to perform various actions and operations, such as but not limited to: create a driver account; access a driver account and other driver related system functionality; edit a driver account; report an availability or unavailability to engage in transportation service events; review, decline, accept or not respond to a proffered vehicle assignment; confirm a vehicle assignment; review a status of, or other information related to, a vehicle assignment; report a status of a transportation service event; report a service issue (e.g., vehicle failure, customer not found at pickup location, etc.); monitor a transportation service event in progress; receive and review information related to a refueling event which may be facilitated in conjunction with a current or previous vehicle assignment; review a history of transportation service events and review earnings related thereto that were facilitated by transportation network platform 100; transfer earnings to a designated account; submit feedback related to a transportation service event or other aspect of interaction with the transportation network platform 100; etc. In some implementations, driver and vehicle account management module 113*b* may comprise software instructions that when executed on at least one server comprised by server based system 110 may at least in part enable a ground vehicle 140/subsystem 140a or an air vehicle 150/subsystem 150a to perform various actions and operations, such as but not limited to: to communicate a status, such as a fuel status and/or vehicle range; report an availability or unavailability to engage in transportation service events; and in some implementations in the case of an autonomous ground vehicle 140 or an autonomous air vehicle 150, to receive vehicle assignments, coordinate transportation service events and coordinate refueling events. Data, such as data associated with driver accounts, vehicle accounts, vehicle assignments, transportation service events and refueling events may be comprised by database(s) 111b and may be received, processed, generated and/or modified by driver and vehicle account management module 113b in conjunction with data services module 111a.

Transportation management and fare processing module 114 may receive transportation requests which may originate from a customer such as customer 102. Customer 102 may operate a customer device such as customer device 120 which may be in communication with server based system 110 and application and data services 110a via communications links 182 and 181 and network 180. Customer device 120 may interface with customer application systems interface module 112a and thereby may interact with customer account management module 112b which may interact with transportation management and fare processing module 114, whereby customer 102 may create and submit a transportation request. A transportation request may be assessed to determine a chargeable fare and in some implementations may be assessed to determine and resolve constraints on aspects of the request, such as but not limited to, a pickup location, a destination and/or a service type. A response to a transportation request may be presented to customer 102 as a transportation quote. If a transportation quote is accepted and confirmed by customer 102, a confirmed transportation request may be created and an assignment of the transportation request to a ground vehicle 140 or an air vehicle 150 may be proffered thereto. If a proffered vehicle assignment is accepted by a driver 103, driver (pilot) 103a, autonomous ground vehicle 140 or autonomous air vehicle 150, a vehicle assignment may be created. Data, such as data associated with a transportation request, transportation quote, confirmed transportation request, proffered vehicle assignment (also called tentative vehicle assignment) and vehicle assignment may be recorded in database(s) 111b via data services module 111a. A resulting transportation service event following a confirmed transportation request and vehicle assignment may be monitored by transportation management and fare processing module 114 and details thereof may be recorded in database(s) 111b via data services module 111a. Upon completion of a transportation service event, a fare can be processed resulting in a payment by customer 102 and a credit to an account associated with the assigned ground vehicle 140 and/or driver 103, or air vehicle 150 and/or driver (pilot) 103a.

Transportation management and fare processing module 114 may access route analysis and infrastructure management module 116 and may analyze and determine routes which may be used in completing a transportation service event associated with a transportation request. In some implementations, routes analyzed and determined may include, but are not limited to, one or more routes between a customer pickup location, such as customer location 172, and a destination, such as destination location 178, one or more routes associated with a potential vehicle assignment, such as routes between a current vehicle location, such as current vehicle location 174 or current vehicle location 175, and a customer pickup location, such as customer location 172, and one or more routes associated with a refueling event potentially facilitated in conjunction with a potential vehicle assignment, such as one or more routes between a destination location, such as destination location 178, and a fuel unit location, such as fuel unit location 176. Routes analyses and determinations may be based at least in part on data associated with a current or anticipated infrastructure status (e.g., traffic status, traffic accidents, road closings, usage tolls, lane closures, etc.). Transportation management and fare processing module may access vehicle assignment and fleet management module 115 to assess available vehicles for a vehicle assignment and current statuses thereof, and in some implementations may assess scheduling and refueling constraints and preferences associated with available vehicles.

Route analysis and infrastructure management module 116 may access data services 111a to retrieve route data, wherein such route data may be maintained by transportation network platform 100 in database(s) 111b, and/or may be accessed as a service of one or more providers of such route or map data. In some implementations, such service provider access may be facilitated at least in part by third party application and operator application systems interface module 119a, system management module 119b and route analysis and infrastructure management module 116. Route data may be analyzed to determine potential routes, and/or a provider service may provide a results lists of one or more potential routes and supporting analysis such as route distance, route time, variability of route time, and the like. Data, such as data associated with routes and infrastructure may be comprised by database(s) 111b and may be received, processed, generated and/or modified by route analysis and infrastructure management module 116 in conjunction with data services module 111a.

Vehicle assignment and fleet management module 115 may receive vehicle data such as vehicle type, make, model, age, mileage, condition, registration, driver, owner, availability status, location, present vehicle assignment if any, actual or estimated fuel status, actual or estimated vehicle range, and the like. In some implementations, vehicle assignment and fleet management module 115 may receive other vehicle related data such as data associated with vehicle scheduling and refueling constraints and preferences. Vehicle related data may be submitted by a vehicle driver such as driver 103 or driver (pilot) such as driver (pilot) 103a or by vehicle owners or vehicle operators, such owners or operators of autonomous vehicles. Vehicle related data may be submitted by driver devices such as driver devices 103 and 103a, and vehicle subsystems 140a and 150a via driver application and vehicle systems interface module 113a, or via an operator's system (not shown) and third party application and operator application systems interface 119a. Vehicle related data may be submitted by and/or corroborated using authority data services such as those operated by government motor vehicle services, wherein such data may be submitted via third party application and operator application systems interface 119a. Data, such as data associated with vehicles may be comprised by database(s) 111b and may be received, processed, generated and/or modified by vehicle assignment and fleet management module 115 in conjunction with data services module 111a.

Systems management module 119b may be accessed via third party application and operator application systems interface module 119a, which may comprise a data services interface, an application programming interface (API) and/or an application services interface that programmatically interacts with a device, such as an operator device 190, usable by an operator (not shown) of transportation network platform 100. Systems management module 119*b* and operator application systems interface module 119*a* may interact with fuel units, such as fuel unit 160 or a third party operator thereof, and receive status, availability and other data associated with fuel unit 160. Systems management module 119*b* and operator application systems interface module 119*a* may interact with third party systems, such as but not limited to, systems of providers of route data, route analysis and infrastructure data and authority systems such as systems of motor vehicle services. Systems management module 119*b* may comprise workflow and logic for ongoing management, operations and maintenance of transportation network platform 100. Systems management module 119*b* may comprise software instructions that when executed on at least one server comprised by server based system 110 may enable an operator to perform various actions and operations, such as but not limited to: update system software, address bug reports, address system service requests, check database storage capacity and latency, check server loads, update hardware, deploy hardware, reconfigure hardware, generate reports, review system transportation request volume, vehicle availability, transportation network platform performance metrics (response time to customer/cargo pickup following request, customer satisfaction ratings, etc,), engage in customer support chat sessions, and the like. Systems management module 119*b* may comprise software instructions that when executed on at least one server comprised by server based system 110 may enable a receiving of fuel unit data, route data, route analysis or infrastructure data. Data, such as data associated with systems management may be comprised by database(s) 111*b* and may be received, processed, generated and/or modified by systems management module 119*b* in conjunction with data services module 111*a*.

Figure 1C:
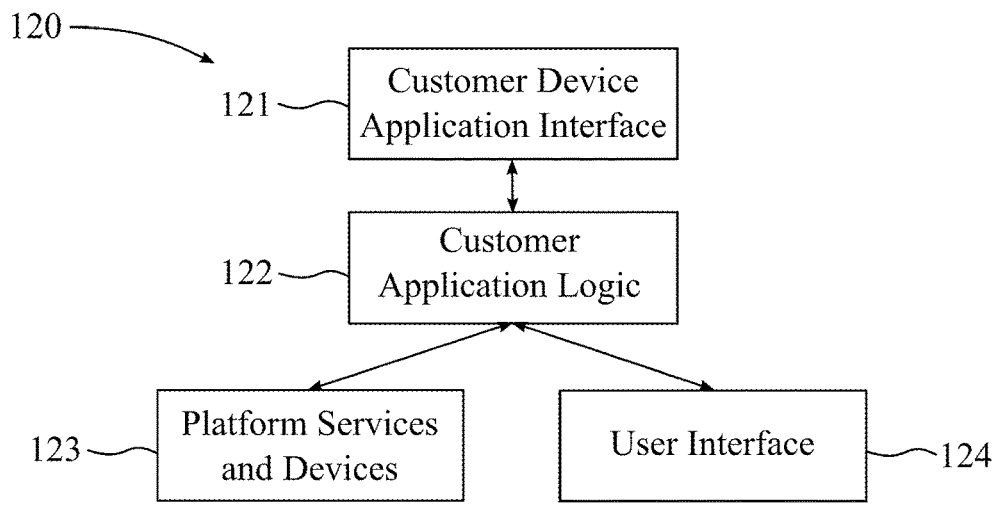
FIG. 1C depicts a block diagram of an example device which may be usable by a customer to interact with the system of FIG. 1A.
Figure 1D:
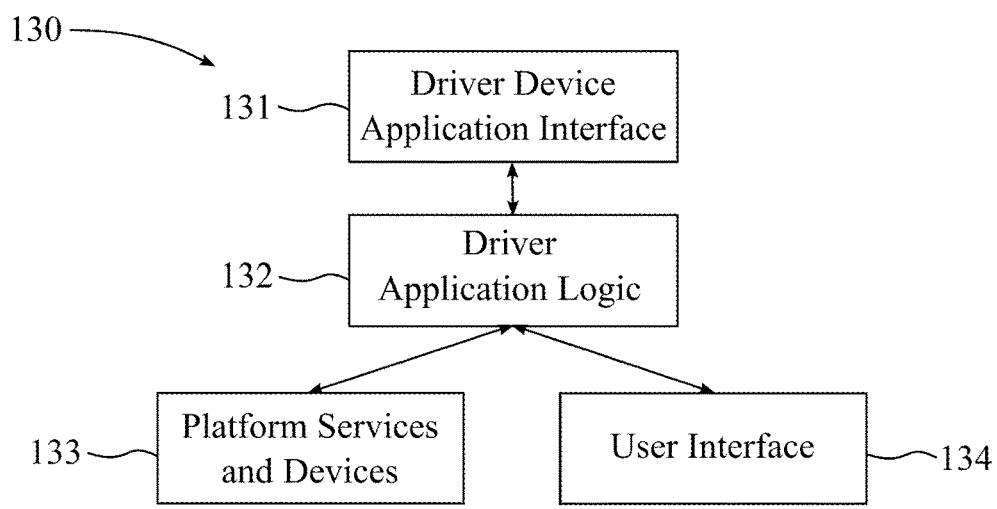
FIG. 1D depicts a block diagram of an example device which may be usable by a driver or pilot of a vehicle engaged to provide services in the system of FIG. 1A to interact therewith.
Figure 1E:
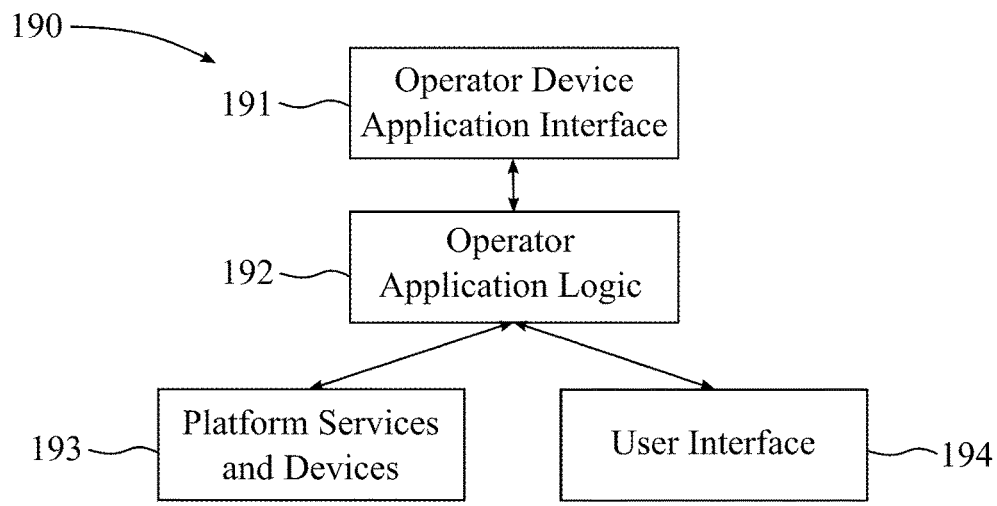
FIG. 1E depicts a block diagram of an example device which may be usable by an operator of the system of FIG. 1A to interact therewith.

Various devices may be usable by users, operators or others to access and interact with transportation network platform 100. FIG. 1C depicts a block diagram of an example implementation of a customer device 120 which may be usable by a customer such as customer 102 to interact with transportation network platform 100 of FIG. 1A. FIG. 1D depicts a block diagram of an example implementation of a driver device 130 which may be usable by a driver such as driver 103 or driver (pilot) 103*a* to interact with transportation network platform 100 of FIG. 1A. FIG. 1E depicts a block diagram of an example implementation of an operator device 190 which may be usable by an operator (not shown in FIG. 1A) to interact with transportation network platform 100 of FIG. 1A.

Customer device 120 may be typically be a smartphone device and may also be a notepad device, notebook device, computer device or other device. Customer device 120 may comprise various user interface components such as but not limited to a touchscreen, a keyboard, a display and/or an audio interface. Customer device 120 may comprise a capability to interact with transportation network platform 100 such that customer 102 using such a device may interact with transportation network platform 100. Customer device 120 may comprise a customer device application interface 121, customer application logic 122, platform services and devices 123 and a user interface 124. FIG. 1C depicts one of many possible ways to implement, organize and illustrate interfaces, application logic such as software instructions executed by at least one processor of customer device 120, platform services and devices that may reside on a customer device such as customer device 120. Customer application logic may comprise software instructions of a downloadable customer software application which may be provided for such download by transportation network platform 100. Also referring to FIG. 1A and FIG. 1B, customer application logic 122 may provide for management and control of a customer interaction with a customer device 120 and a customer account comprised by transportation network platform 100 via customer device application interface 121 which may be connected to customer application systems interface module 112*a* of application and data services 110*a* over communications network 180 and communications links 182 and 181. In some implementations, customer application logic 122 may control user interface 124 to display information, such as for example, a customer account status display screen, a menu of available customer operations display screen, a transportation request entry display screen, a transportation quote display screen, a transportation quote confirmation screen, a confirmed transportation request screen, a pending transportation service event pickup status display screen, a transportation service event status display screen, a payment for transportation service event display screen, a transportation service event rating display screen, and the like. Customer application logic 122 may receive customer input from user interface 124 such as for example, a customer account profile entry or edit, a selection from a menu of available customer operations, a transportation request submission, a notation that the customer has visually identified an assigned vehicle having arrived for a pickup, a payment confirmation acknowledgement, a customer rating input for a completed transportation service event, and the like. Customer application logic 122 may access platform services and devices 123 to interact with a plurality of platform services and devices 123 of customer device 120, such as, computing resources, data storage and access resources, device communications, geo location services, voice communications, text communications, audio speakers/headphones, sensors, a camera, video communications, and the like. While FIG. 1C may be typically illustrative of a smartphone customer device 120, various user devices capable of real time communication by a device user, and communication over communications network 180 and communications links 182 and 181 may be used to permit a customer to interact with transportation network platform 100, such as smartphones, tablets, smartwatches, notebooks, computers and other computing devices. In some implementations, customer interaction with transportation network platform 100 may be at least in part audio interactions, wherein voice recognition and voice response systems may be comprised by server based system 110 and/or customer device 120.

Driver device 130 or driver (pilot) device 130*a* may be typically be a smartphone device and may also be a notepad device, notebook device, computer device or other device. Driver device 130 or driver (pilot) device 130*a* may comprise various user interface components such as but not limited to a touchscreen, a keyboard, a display and/or an audio interface. Driver device 130 or driver (pilot) device 130*a* may comprise a capability to interact with transportation network platform 100 such that driver 103 or driver (pilot) 103*a* using such a device may interact with transportation network platform 100. Driver device 130 (or 130*a*) may comprise a driver device application interface 131, application logic and workflow 132, platform services and devices 133 and a user interface 134. FIG. 1D depicts one of many possible ways to implement, organize and represent interfaces, application logic such as software instructions executed by at least one processor of driver device 130 (or 130*a*), platform services and devices that may reside on a driver device such as driver device 130 (or 130*a*). Driver application logic may comprise software instructions of a downloadable driver software application which may be provided for such download by transportation network platform. Also referring to FIG. 1A and FIG. 1B, driver application logic 132 may provide for management and control of a driver interaction with a driver device 130 (or 130*a*) and a driver account comprised by transportation network platform 100 via driver device application interface 131 which may be connected to driver application and vehicle systems interface module 113*a* of application and data services 110*a* over communications network 180 and communications links 183 (or 183*a*) and 181. In some implementations, driver application logic 132 may control user interface 134 to display information, such as for example, a driver account status display screen, a menu of available driver operations display screen, an availability reporting display screen for reporting availability to engage in vehicle assignments, a preferred fuel unit(s) and/or location(s) display screen, a confirmation of vehicle being used for vehicle assignments display screen, a proffered vehicle assignment acceptance or rejection display screen, a vehicle assignment confirmation display screen, a vehicle assignment status display screen, a pending transportation service event pickup status display screen, a transportation service event status display screen, a transportation service event rating display screen, a history of transportation service events display screen, a payment received screen, a review earnings display screen, a transfer earnings display screen, and the like. Driver application logic 132 may receive driver input from user interface 134 such as for example, a driver account profile entry and edit, a selection from a menu of available driver operations, an availability status or schedule thereof, an entry of a preferred fuel unit(s) and/or location(s), a confirmation of a vehicle being used for vehicle assignments, a vehicle assignment acceptance or rejection, an indication that the driver has made a customer/cargo pickup, an indication that the driver has made a customer drop off, a customer rating input for a completed transportation service event, an entry related to a transfer of earnings, and the like. Driver application logic 132 may access platform services and devices 133 to interact with a plurality of platform services and devices 133 of driver device 130 (or 130*a*), such as, computing resources, data storage and access resources, device communications, geo location services, voice communications, text communications, audio speakers/headphones, sensors, a camera, video communications, and the like. While FIG. 1D may be typically illustrative of a smartphone driver device 130 (or 130*a*), various user devices capable of real time communication by a device user, and communication over communications network 180 and communications links 183 (or 183*a*) and 181 may be used to permit a driver to interact with transportation network platform 100, such as smartphones, tablets, smartwatches, notebooks, computers and other computing devices. In some implementations, driver interaction with transportation network platform 100 may be at least in part audio interactions, wherein voice recognition and voice response systems may be comprised by server based system 110 and/or driver device 30 (or 130*a*).

Operator device 190 may typically be a computer device and may also be a smartphone device, notepad device, notebook device or other device. Operator device 190 may comprise various user interface components such as such as but not limited to a touchscreen, a keyboard, a mouse, a display and/or an audio interface. Operator device 190 may comprise a capability to interact with transportation network platform 100 such that an operator using such a device may interact with transportation network platform 100. Operator device 190 may comprise an operator device application interface 191, operator application logic 192, platform services and devices 193 and a user interface 194. FIG. 1E depicts one of many possible ways to implement, organize and represent interfaces, application logic such as software instructions executed by at least one processor of operator device 190, platform services and devices that may reside on an operator device such as operator device 190. Application logic may comprise software instructions of a downloadable operator software application which may be provided for such download by transportation network platform 100. Also referring to FIG. 1A and FIG. 1B, operator application logic 192 may provide for management and control of an operator interaction with an operator device 190 and systems management services comprised by transportation network platform 100 via operator device application interface 191 which may be connected to third party application and operator application systems interface module 119*a* of application and data services 110*a* over communications network 180 and communications links 189 and 181. In some implementations, operator application logic 192 may control user interface 194 to display information, such as for example, an operator account status display screen, a menu of available operator operations display screen, an update system software display screen, a check database storage capacity and latency display screen, a check server load display screen, a generate reports display screen, a review system transportation request volume display screen, a vehicle availability display screen, a transportation network platform performance metrics (response time to customer/cargo pickup following request, customer satisfaction ratings, etc.) display screen, an engage in customer support chat sessions display screen, and the like. Operator application logic 192 may receive operator input from user interface 194 such as for example, an operator account profile entry and edit, a selection from a menu of available operator operations, an update system software related entry, a check database storage capacity and latency selection, a check server load selection, a generate reports selection, a selection to review system transportation request volume, a display vehicle availability selection, a selection to display transportation network platform performance metrics (response time to customer/cargo pickup following request, customer satisfaction ratings, etc.), a selection to engage in a customer support chat session and text input related thereto, and the like. Operator application logic 192 may access platform services and devices 193 to interact with a plurality of platform services and devices 193 of operator device 190, such as, computing resources, data storage and access resources, device communications, geo location services, voice communications, text communications, audio speakers/headphones, sensors, a camera, video communications, and the like. While FIG. 1E may be typically illustrative of a notebook operator device 190, various user devices capable of real time communication by an operator, and communication over communications network 180 and communications links 189 and 181 may be used to permit an operator to interact with transportation network platform 100, such as smartphones, tablets, smartwatches, notebooks, computers and other computing devices. In some implementations, operator interaction with transportation network platform 100 may be at least in part audio interactions, wherein voice recognition and voice response systems may be comprised by server based system 110 and/or operator device 190.

Figure 1F:
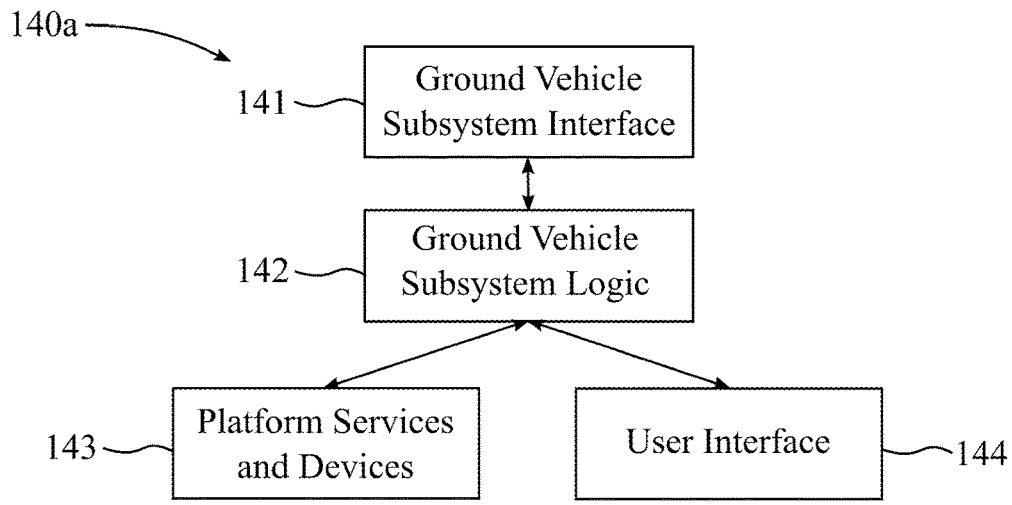
FIG. 1F depicts a block diagram of an example implementation of a subsystem comprised by a ground vehicle which may interact with the system of FIG. 1A.
Figure 1G:
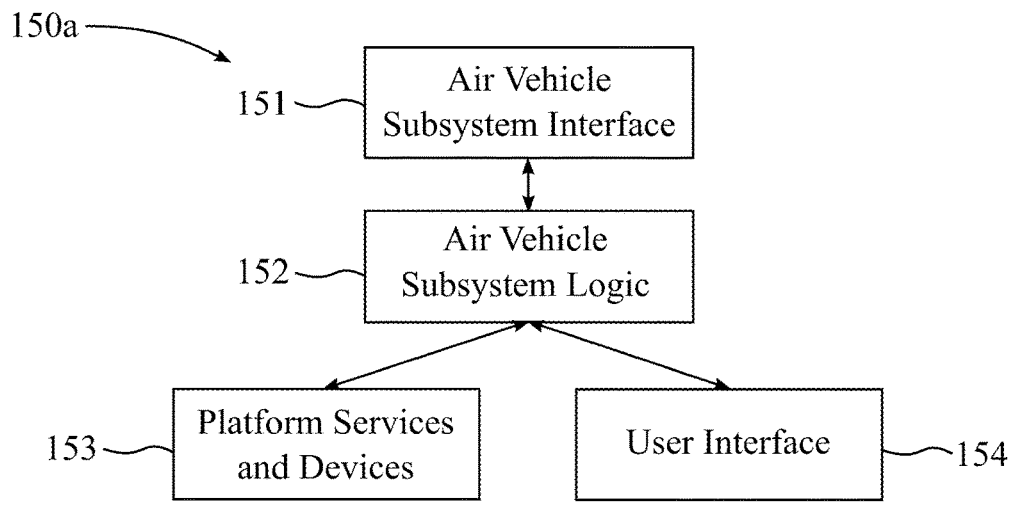
FIG. 1G depicts a block diagram of an example implementation of a subsystem comprised by an air vehicle which may interact with the system of FIG. 1A.
Figure 1H:
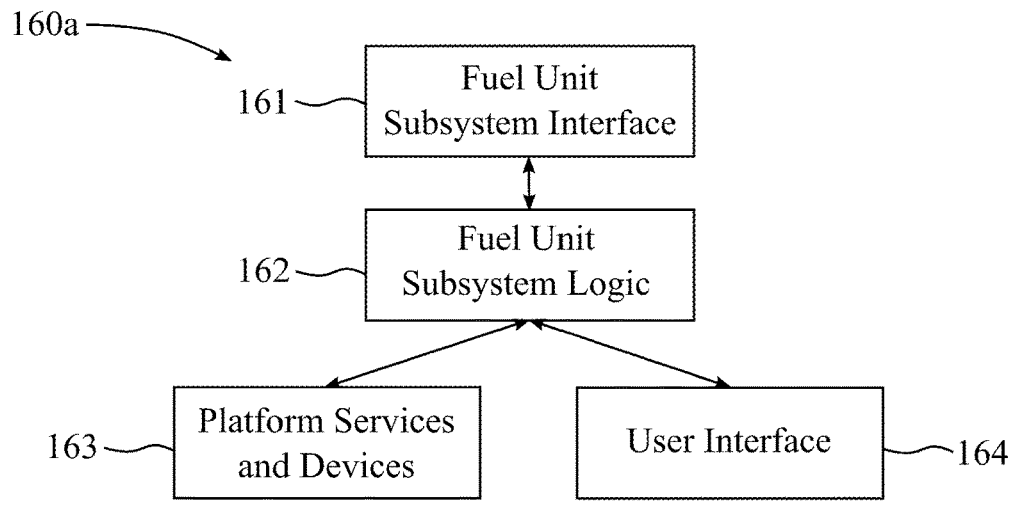
FIG. 1H depicts a block diagram of an example implementation of a subsystem comprised by a fuel unit which may interact with the system of FIG. 1A.

In some implementations, a ground vehicle such as ground vehicle 140 or an air vehicle such as air vehicle 150 may access and interact with transportation network platform 100, directly and/or indirectly via a relay through another device, such as driver device 130 or driver (pilot) device 130a as shown in FIG. 1A. In some implementations, a fuel unit such as fuel unit 160 access and interact with transportation network platform 100, directly and/or indirectly via a relay through a third party or other device (not shown in FIG. 1A). FIG. 1F depicts a block diagram of an example implementation of a subsystem 140a comprised by ground vehicle 140 which may interact directly and/or indirectly with transportation network platform 100 of FIG. 1A. FIG. 1G depicts a block diagram of an example implementation of a subsystem 150a of air vehicle 150 which may interact directly and/or indirectly with transportation network platform 100 of FIG. 1A. FIG. 1H depicts a block diagram of an example implementation of a subsystem 160a of fuel unit 160 which may interact directly and/or indirectly with transportation network platform 100 of FIG. 1A.

Ground vehicle subsystem 140a of ground vehicle 140 may comprise a ground vehicle subsystem interface 141, ground vehicle subsystem logic 142, platform services and devices 143 and a user interface 144. FIG. 1F depicts one of many possible ways to implement, organize and illustrate interfaces, application logic such as software instructions executed by at least one processor of ground vehicle subsystem 140a, platform services and devices that may reside on a ground vehicle and subsystem such as ground vehicle subsystem 140a. In some implementations, ground vehicle subsystem logic 142 may comprise software instructions of a downloadable vehicle software application which in some implementations may be provided for such download by transportation network platform 100. In some implementations, ground vehicle subsystem logic 142 may facilitate interaction of a ground vehicle 140 with transportation network platform 100. Ground vehicle subsystem logic 142 may access platform services and devices 143 to interact with one or more platform services and devices of subsystem 140a, such as, geo location services, fuel status sensors, vehicle range determination services, tire inflation sensors, engine status reporting, brake system status reporting, vehicle speed and direction reporting, a camera, computing resources, data storage and access resources, and device communications. Ground vehicle subsystem logic 142 may provide for acquisition of statuses and data relating to ground vehicle 140, such as statuses and data acquired from platform services and devices 143, and the reporting of such statuses and data to transportation network platform 100. Ground vehicle subsystem interface 141 may interface with driver application and vehicle systems interface module 113a of application data services 110a of transportation network platform 100 to report such statuses and data. For example, ground vehicle subsystem 140a may communicate a status, such as a fuel status and/or vehicle range, or a location, such as by reporting a GPS location (i.e., a set of coordinates identifying a location as reported by a Global Positioning System). In some implementations, such communicating of status and reporting of location may be relayed by a driver device such as driver device 130 to driver application and vehicle systems interface module 113a of application and data services 110a of transportation network platform 100 via a communications path comprising link 184a, link 183, network 180 and link 181. In some implementations, such communicating of status and reporting of location may be communicated directly to driver application and vehicle systems interface module 113a of application and data services 110a of transportation network platform 100 via a communications path comprising link 184, network 180 and link 181. In some implementations, ground vehicle subsystem logic 142 may facilitate interaction of a driver 103 with transportation network platform 100, wherein in some implementations a driver device 130 may be optional or not required for a driver 103 to interact with transportation network platform 100. User interface 144 may comprise various user interface components such as a touchscreen, a keyboard, a display and/or an audio interface, wherein such user interface components may be at least partially integrated into or shared user interface components of ground vehicle 140. In some implementations, ground vehicle subsystem 140a may receive a vehicle assignment to a transportation request. In some implementations, a vehicle assignment received by ground vehicle subsystem 140a may be presumed confirmed. In some implementations, ground vehicle subsystem 140a of an autonomous ground vehicle 140 may receive a vehicle assignment from transportation network platform 100, wherein a transportation service event is thereby initiated and autonomous ground vehicle 140 may initiate travel to a customer pickup. In some implementations, ground vehicle subsystem 140a may receive other transportation service event data from transportation network platform 100, such as but not limited to, customer pickup data, customer destination data, refueling event data, route data, traffic data, and the like.

Air vehicle subsystem 150a of air vehicle 150 may comprise an air vehicle subsystem interface 151, air vehicle subsystem logic 152, platform services and devices 153 and a user interface 154. FIG. 1F depicts one of many possible ways to implement, organize and illustrate interfaces, application logic such as software instructions executed by at least one processor of air vehicle subsystem 150a, platform services and devices that may reside on an air vehicle and subsystem such as air vehicle subsystem 150a. In some implementations, air vehicle subsystem logic 152 may comprise software instructions of a downloadable vehicle software application which in some implementations may be provided for such download by transportation network platform 100. In some implementations, air vehicle subsystem logic 152 may facilitate interaction of an air vehicle 150 with transportation network platform 100. Air vehicle subsystem logic 152 may access platform services and devices 153 to interact with one or more platform services and devices of subsystem 150a, such as, geo location services, fuel status sensors, vehicle range determination services, tire inflation sensors, engine status reporting, brake system status reporting, vehicle speed and direction reporting, a camera, computing resources, data storage and access resources, and device communications. Air vehicle subsystem logic 152 may provide for acquisition of statuses and data relating to air vehicle 150, such as statuses and data acquired from platform services and devices 153, and the reporting of such statuses and data to transportation network platform 100. Air vehicle subsystem interface 151 may interface with driver application and vehicle systems interface module 113a of application data services 110a of transportation network platform 100 to report such statuses and data. For example, air vehicle subsystem 150a may communicate a status, such as a fuel status and/or vehicle range, or a location, such as by reporting a GPS location (i.e., a set of coordinates identifying a location as reported by a Global Positioning System). In some implementations, such communicating of status and reporting of location may be relayed by a driver device such as driver (pilot) device 130a to driver application and vehicle systems interface module 113a of application and data services 110a of transportation network platform 100 via a communications path comprising link 185a, link 183a, network 180 and link 181. In some implementations, such communicating of status and reporting of location may be communicated directly to driver application and vehicle systems interface module 113a of application and data services 110a of transportation network platform 100 via a communications path comprising link 185, network 180 and link 181. In some implementations, air vehicle subsystem logic 152 may facilitate interaction of a driver (pilot) 103a with transportation network platform 100, wherein in some implementations a driver (pilot) device 130a may be optional or not required for a driver (pilot) 103a to interact with transportation network platform 100. User interface 154 may comprise various user interface components such as a touchscreen, a keyboard, a display and/or an audio interface, wherein such user interface components may be at least partially integrated into or shared user interface components of air vehicle 150. In some implementations, air vehicle subsystem 150a may receive a vehicle assignment to a transportation request. In some implementations, a vehicle assignment received by air vehicle subsystem 150a may be presumed confirmed. In some implementations, air vehicle subsystem 150a of an autonomous air vehicle 150 may receive a vehicle assignment from transportation network platform 100, wherein a transportation service event is thereby initiated and autonomous air vehicle 150 may initiate travel to a customer pickup. In some implementations, air vehicle subsystem 150a may receive other transportation service event data from transportation network platform 100, such as but not limited to, customer pickup data, customer destination data, refueling event data, route data, traffic data, and the like.

Fuel unit subsystem 160a of fuel unit 160 may comprise a fuel unit subsystem interface 161, fuel unit subsystem logic 162, platform services and devices 163 and a user interface 164. FIG. 1F depicts one of many possible ways to implement, organize and illustrate interfaces, application logic such as software instructions executed by at least one processor of fuel unit subsystem 160a, platform services and devices that may reside on a fuel unit and subsystem such as fuel unit subsystem 160a. In some implementations, fuel unit subsystem logic 162 may comprise software instructions of a downloadable vehicle software application which in some implementations may be provided for such download by transportation network platform 100. In some implementations, fuel unit subsystem logic 162 may facilitate interaction of a fuel unit 160 with transportation network platform 100. Fuel unit subsystem logic 162 may access platform services and devices 163 to interact with one or more platform services and devices of subsystem 160a, such as, fueling status sensors, fuel storage level status sensors, geo location services, computing resources, data storage and access resources, and device communications. Fuel unit subsystem logic 162 may provide for acquisition of statuses and data relating to fuel unit 160, such as statuses and data acquired from platform services and devices 163, and the reporting of such statuses and data to transportation network platform 100. Fuel unit subsystem interface 161 may interface with third party application and operator applications systems interface module 119a of application data services 110a of transportation network platform 100 to report such statuses and data. For example, fuel unit subsystem 160a may communicate a status, such as a fuel unit availability, a fuel type, a vehicle interface type, and a location, such as by reporting a GPS location (i.e., a set of coordinates identifying a location as reported by a Global Positioning System). In some implementations, such communicating of status and reporting of location may be communicated directly to third party application and operator applications systems interface module 119a of application data services 110a via a communications path comprising link 186, network 180 and link 181. In some implementations, such communicating of status and reporting of location to transportation network platform 100 may be communicated via a third party operator (not shown in FIG. 1A) of a fuel unit 160. User interface 164 may comprise various user interface components such as a touchscreen, a keyboard, a display and/or an audio interface, wherein such user interface components may be at least partially integrated into or shared user interface components of fuel unit 160. In some implementations, fuel unit subsystem 160a may receive a payment or credit for vehicle fueling from transportation network platform 100.

Figure 1I:
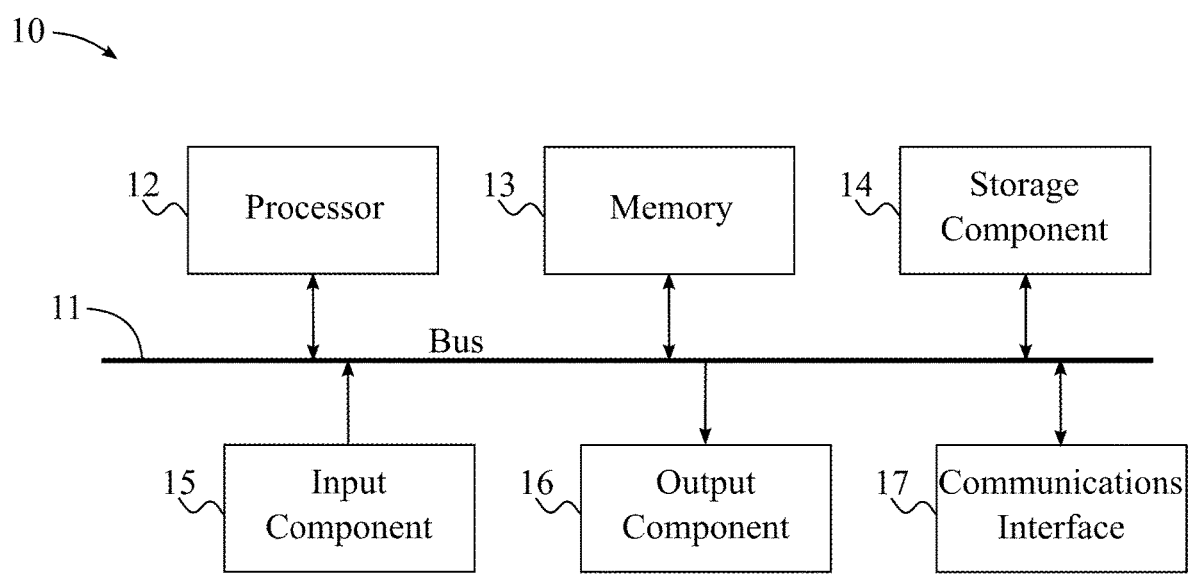
FIG. 1I depicts an example block diagram of example components of a device or subsystem.

FIG. 1I is an example block diagram of example components of a device 10, wherein device 10 may correspond to various user devices or other devices, such as customer device 120, driver device 130 and operator device 190 discussed above which enable customers, drivers and operators to interact with application and data services 110a of server based system 110 and application and data services system 110a thereof. Device 10 may correspond to one or more devices comprised by server based system 110, such as one or more servers thereof and may correspond to one or more devices comprised by a cloud-based system potentially comprising application and data services system 110a and potentially comprising server based system 110 in part. Device 10 may correspond to a subsystem of a vehicle, such as ground vehicle subsystem 140a of ground vehicle 140 or air vehicle subsystem 150a of air vehicle 150, or a subsystem of a fuel unit, such as fuel unit subsystem 160a fuel unit 160. In some implementations, a device of server based system 110, customer device 120, driver device 130, operator device 190 ground vehicle subsystem 140a, air vehicle subsystem 150a and/or fuel unit subsystem 160a may include one or more devices 10 and/or one or more components of device 10.

Bus 11 includes a component that permits communication among the components of device 10. Processor 12 may be implemented in hardware, firmware, or a combination of hardware and firmware. Processor 12 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 12 includes one or more processors capable of being programmed to perform a function. Memory 13 includes a random access memory (RAM), a read only memory (ROM), and/or another type of dynamic or static storage device (e.g., a flash memory, a magnetic memory, and/or an optical memory) that stores information and/or instructions for use by processor 12.

Storage component 14 stores information and/or software related to the operation and use of device 10. For example, storage component 14 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 15 includes a component that permits device 10 to receive information, such as via user input (e.g., a touch screen display, a keyboard, a keypad, a mouse, a button, a switch, and/or a microphone). Additionally, or alternatively, input component 15 may include a sensor for sensing information (e.g., a global positioning system (GPS) component, an accelerometer, a gyroscope, and/or an actuator). Output component 16 includes a component that provides output information from device 10 (e.g., a display, a speaker, and/or one or more light-emitting diodes (LEDs)).

Communication interface 17 includes a transceiver-like component (e.g., a transceiver and/or a separate receiver and transmitter) that enables device 10 to communicate with other devices, such as via a wired connection, a wireless connection, or a combination of wired and wireless connections. Communication interface 17 may permit device 10 to receive information from another device and/or provide information to another device. For example, communication interface 17 may include an Ethernet interface, an optical interface, a coaxial interface, an infrared interface, a radio frequency (RF) interface, a universal serial bus (USB) interface, a Wi-Fi interface, a cellular network interface, or the like.

Device 10 may perform one or more processes described herein. Device 10 may perform these processes in response to processor 12 executing software instructions stored by a non-transitory computer-readable medium, such as memory 13 and/or storage component 14. A computer-readable medium is defined herein as a non-transitory memory device. A memory device includes memory space within a single physical storage device or memory space spread across multiple physical storage devices. In some implementations, a memory device may be cloud-based, partially cloud-based, or not cloud-based.

Software instructions may be read into memory 13 and/or storage component 14 from another computer-readable medium or from another device via communication interface 17. When executed, software instructions stored in memory 13 and/or storage component 14 may cause processor 12 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1I are provided as an example. In practice, device 10 may include additional components, fewer components, different components, or differently arranged components than those shown in FIG. 1I. Additionally, or alternatively, a set of components (e.g., one or more components) of device 10 may perform one or more functions described as being performed by another set of components of device 10.

Figure 2A:
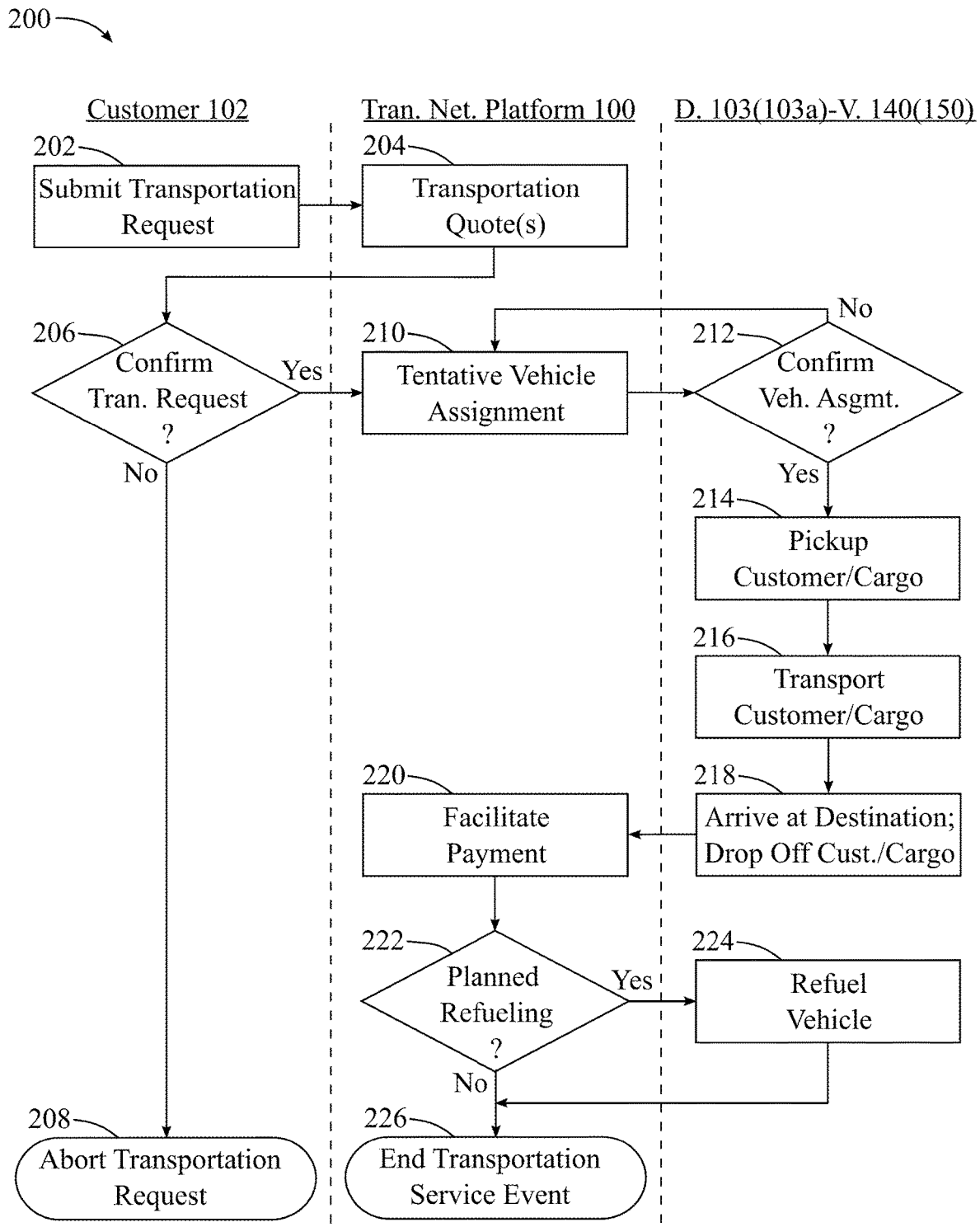
FIG. 2A depicts a flow diagram of an example transportation service event process.

FIG. 2A depicts a flow diagram of an example transportation service event process 200 of transportation network platform 100. Process 200 may begin with a transportation request submitted by customer 102 in step 202 and may end in step 226, wherein a transportation service event may end following a completion of a vehicle assignment by driver 103 or driver 103a and ground vehicle 140 or air vehicle 150, which may be denoted as driver 103(103a)-vehicle 140(150), wherein such an assignment may have an associated refueling event planned in conjunction therewith. In the example transportation service event process 200 of FIG. 2A, process 200 is depicted having three columns, wherein each column generally represents actions or activities of a primary party and the primary party is indicated in a heading of each column. Namely, the left column generally comprises actions and activities of a customer such as customer 102, wherein customer 102 may use a customer device 120 to engage in such activities; the middle column generally comprises actions and activities of transportation network platform 100; and the right column generally comprises actions and activities of a driver and/or vehicle such as driver 103 and ground vehicle 140 or driver (pilot) 103a and air vehicle 150, or autonomous ground vehicle 140 or autonomous air vehicle 150, wherein driver 103(103a)-vehicle 140(150) may use driver device 130, driver (pilot) device 130a, vehicle subsystem 140a and/or vehicle subsystem 150a to engage in such activities. As noted earlier, a driver 103 or driver (pilot) 103a may be called a vehicle operator, and may be an in-vehicle operator or a remote vehicle operator. For example, a vehicle, such as a ground vehicle 140 or an air vehicle 150 may be a drone vehicle having a human remote vehicle operator (not shown) which at least in part may control actions of the drone vehicle. This may be distinguished from an autonomous vehicle which may not have a human remote vehicle operator and may be controlled by vehicle control systems, however both such implementations of a drone vehicle having a remote vehicle operator and an autonomous vehicle may typically not have a human operator such as a driver 103 or pilot (pilot) 103a present in the vehicle.

Transportation service event process 200 begins in step 202, wherein a customer such as customer 102 may submit a transportation request to transportation network platform 100. In step 204, in response to a transportation request submitted by customer 102, transportation network platform may generate a transportation quote(s), which may be a plurality of quotes corresponding to a plurality of service options, such as a plurality of types of vehicles which may be chosen by customer 102 to service the transportation request, and send such quote(s) to customer 102. In some implementations, as customer 102 is entering one or more details regarding a transportation request, transportation network platform may send one or more quotes based on possible request scenarios, such as a matching of one or more request details (e.g., previous destinations, service types, number of passengers, etc.) of previous transportation requests and/or transportation service events associated with customer 102. In such implementations, one or more transportation requests may be assembled with corresponding quotes by transportation network 100 and presented thereby to customer 102 as an option(s) for selection by customer 102. Such an interactive process of following one or more entries of request details by customer 102 with an assembling and presentation of quoted request scenarios (not shown) may reduce the amount of information entry required by customer 102 and may expedite the request entry and quote process. In some implementations, transportation network platform 100 may promote certain services in such an interactive process. For example, a type of service may be promoted as a first presented scenario in a list of quoted transportation request scenarios.

In step 206, customer 102 may confirm a transportation request. In some implementations, a quote confirmation by customer 102 may be by selecting a quoted transportation request scenario from one or more quoted transportation request scenarios generated by transportation network 100. If customer 102 does not confirm a transportation request, the overall process may end in step 208 with an aborted transportation request. For example, customer 102 may submit (or begin) a transportation request process to investigate the potential options and/or costs thereof and then decide to forgo a transportation service event. In some implementations, customer 102 may proactively cancel the request, close the app, let a request submission timeout or the like, thereby aborting the transportation request process. If customer 102 confirms a transportation request in step 206, process 200 proceeds to step 210.

In step 210, transportation network platform 100 may assign a vehicle to a confirmed transportation request of customer 102. Such an assignment may be a tentative vehicle assignment, wherein a driver, such as driver 103 or driver (pilot) 103a may be presented with a tentative vehicle assignment for a confirmation of acceptance of the assignment. In step 212, driver 103 (or 103a) may fail to confirm (or vehicle 140 or 105 may autonomously fail to confirm) a vehicle assignment by for example, explicitly rejecting or failing to confirm such assignment within a time window for such confirmation. Should driver (or vehicle) fail to confirm a tentative vehicle assignment, process 200 may return to step 210, wherein transportation network platform 100 may cancel the previously made tentative vehicle assignment and make a next tentative vehicle assignment, wherein process 200 may again proceed to step 212. Should driver 103 or 103a (or an autonomous vehicle 140 or 150) confirm a vehicle assignment in step 212, overall process 200 proceeds to step 214, wherein driver 103(103a)-vehicle 140(150) may pick up customer 102 (and/or cargo).

In some implementations, following a confirmation of a transportation request, transportation network platform 100 may create a tentative vehicle assignment in step 210 and a driver 103(103a) may reject the assignment should they not wish to accept the assignment, and when not rejected, the tentative vehicle assignment is treated as a vehicle assignment. In some implementations transportation network platform 100 may create a vehicle assignment to an autonomous vehicle, wherein no confirmation is given, processed or needed. In some implementations, a vehicle assignment may be presumed accepted when not explicitly rejected by a driver 103 or driver (pilot) 103a.

In step 216 driver 103(103a)-vehicle 140(150) may transport customer 102 and/or cargo and in step 218 arrive at a destination, such as destination 179 and/or destination location 178, whereupon in step 220, transportation network platform 100 may facilitate a payment by customer 102 for a rendered transportation service. In some implementations, transportation network platform 100 may determine a customer/cargo drop off is imminent, occurring or has occurred by a location of vehicle 140(150) which may be reported to transportation network platform 100 as a GPS location by customer device 120, driver device 130(130a) and/or vehicle subsystem 140a(150a), whereupon such reporting, transportation network platform 100 may facilitate a payment for transportation services. In some implementations, transportation network platform may present a confirmation screen to customer device 120, driver device 130(130a), and/or vehicle subsystem user interface 144(154). In some implementations, such a confirmation screen may indicate payment for transportation services is being, has been or will be processed. In some implementations, such a confirmation screen may require an acknowledgement by customer 102 and/or driver 103(103a) to initiate a facilitation of a payment for transportation services.

A vehicle refueling event may have been planned in conjunction with a vehicle assignment, wherein in step 222, if such a refueling event was planned, process 200 proceeds to step 224. In step 224, driver 103(103a)-vehicle 140(150) may refuel vehicle 140 or vehicle 150 and transportation service event process 200 may end in step 226. If in step 222, a refueling event was not planned in conjunction with a vehicle assignment, transportation service event process 200 may end in step 226.

A transportation service event may have an activity which may occur prior to a transporting of a customer/cargo which may be called a pre-transport activity, an activity which may occur with a transporting of a customer/cargo which may be called a transport activity, and an activity which may occur following a transporting of a customer/cargo which may be called a post transport activity. Pre-transport activities may include a vehicle assignment to a transportation request and travel of an assigned vehicle to a pickup location. Transport activities may include a transporting of a customer, such as customer 102, and/or cargo, such as parcel(s) 104, and travel from a pickup location such as customer location 172, to a destination location, such as destination location 178. Post transport activities may include a payment processing which may result in a payment by a customer for rendered transportation services. In some implementations, and in some transportation service events thereof, post transport activities may include a refueling event planned in conjunction with a vehicle assignment.

Figure 2B:
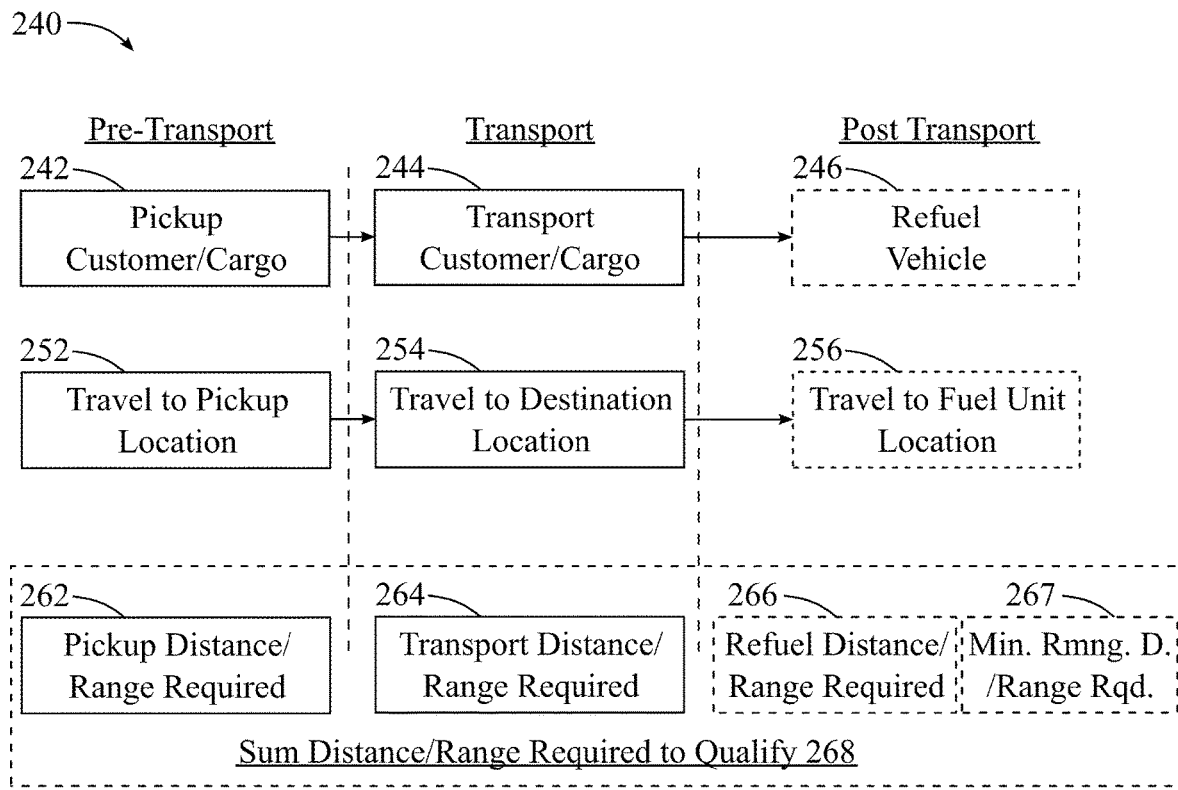
FIG. 2B depicts a block diagram illustrating at least some activities of an example transportation service event.

FIG. 2B depicts a block diagram 240 illustrating at least some activities of an example transportation service event, wherein activities are organized in three columns, namely, a pre-transport column (left column), a transport column (center column) and a post transport column (right column). Each column of diagram 240 is shown with an activity in a top row, which may comprise associated vehicle travel shown is a second row, wherein an associated travel distance and vehicle range required for such travel and a minimum remaining distance/range required is shown in a third row. A block 268 depicted in dashed lines and spanning the third row of the three depicted columns indicates a total range needed for a vehicle to complete a transportation service event comprising required distances/ranges of each column. Pre-transport may comprise an activity to pick up a customer/cargo 242, wherein a vehicle travels to a pickup location 252, which may require a pickup distance and a pickup range 262 be traveled and be expended for such travel, respectively. Transport may comprise an activity to travel to a destination 244 following a pickup, wherein a vehicle travels to a destination location 254, which may require a transport distance and transport range 264 be traveled and be expended for such travel, respectively. In some implementations, and in some transportation service events thereof, post transport may comprise an activity to refuel a vehicle 246 as planned in conjunction with a vehicle assignment, wherein a vehicle travels to a fuel unit location 256, which may require a refuel distance and a refuel range 266 be traveled and be expended for such travel, respectively. In FIG. 2B, blocks representing refuel vehicle 246, travel to fuel unit location 256 and refuel distance/range required 266 are shown in dashed lines to indicate such refueling activities, travel activities and ranges required thereof are not planned in every transportation service event. Post transport block 267 indicates a minimum remaining range which may be required upon completing a transportation service event. In some implementations, as will be described later, a minimum remaining range required 267 may not be required, and block 267 is shown in dashed lines to indicate as such. Block 268 indicates a sum distance/range required to qualify 268 which may be usable to determine if a vehicle comprises a sufficient range to fulfill a transportation request, and thereby usable to qualify a vehicle for a vehicle assignment to a transportation request. In some implementations, a sum distance 268 may comprise a pickup distance 262 and a transport distance 264. In some implementations, such as where a refueling event may be planned a sum distance 268 may comprise a refuel distance 266. In some implementations a sum distance 268 may comprise a minimum remaining distance required 267 (also called minimum remaining range 267), wherein imposing a minimum remaining distance 267 may provide a safety margin to ensure reliable operation of transportation network platform 100, wherein vehicles engaged thereby may not be subject to fully depleting fuel provisions without an intervening refueling event due to estimation errors of ranges, variations in routes, variations in vehicle operation and the like. Transportation network platform 100 may impose a requirement for vehicle assignment, wherein a vehicle range must not be exceeded by a sum distance 268 in order to qualify (or in other words, be determined to have sufficient range to fulfill a transportation request) for a vehicle assignment to an associated transportation request. Imposing such a qualification requirement as a condition for a vehicle assignment may avoid a possibility that a vehicle engaged in a transportation service fully depletes fuel provisions and/or requires refueling while so engaged.

In some implementations, a vehicle qualification determination may be made as shown in Conditional Statement 1 below:

---
CONDITIONAL STATEMENT 1
---
IF (vehicle_range >= (pickup_distance + transport_distance + refuel_distance + minimum_remaining_range));
    THEN vehicle is qualified;
    ELSE vehicle is not qualified
---

In some implementations, a vehicle qualification determination may be made as shown in Conditional Statement 2 below:

---
CONDITIONAL STATEMENT 2
---
IF (vehicle_range − (pickup_distance + transport_distance + refuel_distance)) >= minimum_remaining_range);
    THEN vehicle is qualified;
    ELSE vehicle is not qualified
--- where, for above Conditional Statement 1 and above Conditional Statement 2:
  vehicle_range is a range of a vehicle;
  pickup_distance is a distance of travel from a vehicle location to a pickup location;
  transport_distance is a distance of travel from a pickup location to a destination location;
  refuel_distance is a distance of travel from a destination location to a fuel unit location; and
  minimum_remaining_range is a minimum remaining range a vehicle is required to have following completion of a transportation service event (which may or may not include a refueling event), wherein:
    in some implementations, a condition of greater than (i.e. ">") may be used instead of greater than or equal (i.e. ">=");
    in some implementations, a condition of greater than or approximately equal to may be used instead of greater than or equal; and
    as noted herein, in some implementations a sum distance may not comprise a refuel_distance, wherein refueling events are not scheduled, and in some implementations a sum distance may not comprise a minimum_remaining_range, and as such, refuel_distance and/or minimum_remaining_range may not be present in Conditional Statement 1 or Conditional Statement 2 as given above.

Other implementations for comparisons of sums/subtractions of distances and ranges are possible that will result in an equal effect for making a vehicle qualification determination and are within the scope of the present disclosure.

Figure 2C:
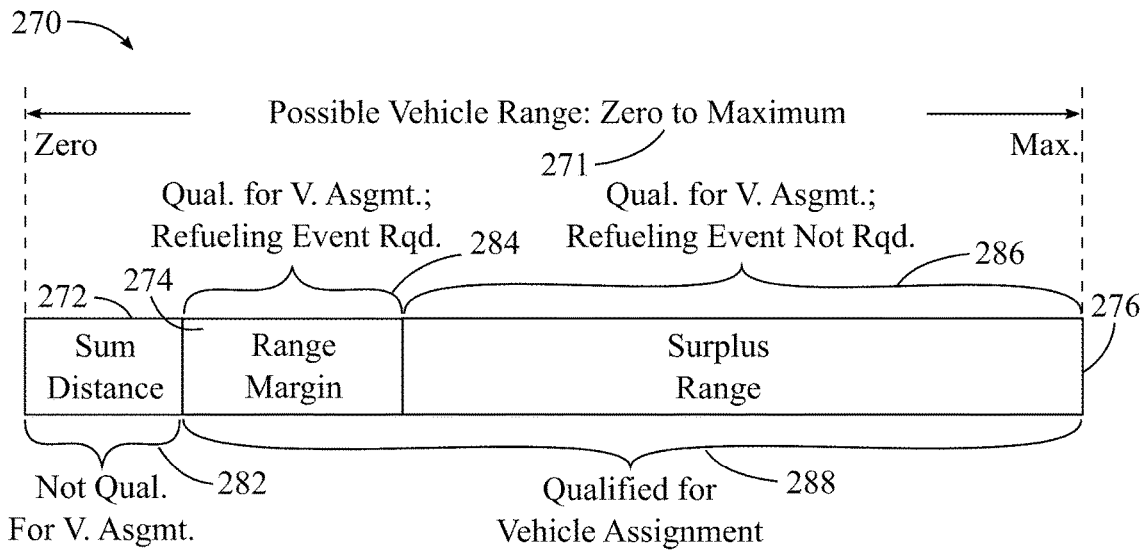
FIG. 2C depicts an example chart of a possible vehicle range distance.

FIG. 2C depicts an example chart of a possible vehicle range distance, such as miles or kilometers, from zero vehicle range distance to a maximum vehicle range distance, wherein a maximum vehicle range is associated with a full fuel store (e.g., a full gas tank, a full battery charge, etc.) and a zero range is associated with an out of fuel or fully depleted fuel condition. Section 272 of chart 270 may represent a portion of a possible vehicle range which may be occupied by a sum distance 272, such as that represented by block 268 of FIG. 2B, wherein a vehicle having a range within block 272 as indicated by bracket 282 may not qualify for a vehicle assignment to a transportation request having an associated sum distance 272, as such a vehicle range when within bracket 282 is exceeded by sum distance 272.

Section 274 of chart 270 may represent a possible vehicle range which may occupy at least a portion of a range margin 274 beyond a sum distance 272, wherein a vehicle having a vehicle range within block 274 as indicated by bracket 284 may qualify for a vehicle assignment to a transportation request having an associated sum distance 272, and may be determined to require a refueling event. A range margin 274 may be a range distance amount which may provide sufficient range for a limited number of transportation service events, which once completed by a vehicle having a vehicle range within a range margin 274 prior to such completion, such vehicle may then be unable to qualify for any additional vehicle assignments, and may risk not reaching a fuel unit for refueling. In some implementations, transportation network platform 100 may use a range margin which equates to a multiple of an average vehicle range required to fulfill transportation requests, such as 3 times an average vehicle range, or 6 times an average vehicle range, or 4 times an average vehicle range required to complete transportation requests, etc. In some implementations, a range margin 274 may vary by a geographic area, a time of day, a rate of transportation service requests, and/or an anticipated rate of future transportation service requests.

Section 276 of chart 270 may represent a possible range which may occupy at least a portion of a surplus range 276 beyond a range margin 274 and a sum distance 272, wherein a vehicle having a vehicle range within block 276 as indicated by indicated by bracket 286 may qualify for a vehicle assignment to a transportation request having an associated sum distance 272, and may be determined to have a sufficient margin of range and a surplus range such that a refueling event in not required. A vehicle having a vehicle range as indicated by bracket 288 may qualify for a vehicle assignment to a transportation request having an associated sum distance 272 and may or may not require refueling depending on if its vehicle range falls in range margin bracket 284 or surplus range bracket 286, respectively.

In order to facilitate transportation services such as those that may be depicted in example transportation service event process 200 of FIG. 2A, data services 111a of application and data services 110a of server based system 110 may maintain and/or access data of one or more databases 111b. Database(s) 111b may comprise one or more database tables comprising data therein, and may be useable in operation of transportation network platform 100. FIG. 3A depicts an example database table, transportation table 300, comprising example transportation records which may be comprised by database(s) 111*b*. FIG. 3B depicts an example database table, location table 340, comprising example location records which may be comprised by database(s) 111*b*. FIG. 3C depicts an example database table, driver-vehicle table 360, comprising example driver-vehicle records which may be comprised by database(s) 111*b*. FIG. 3D depicts an example database table, fuel unit table 380, comprising example fuel unit records which may be comprised by database(s) 111*b*. FIG. 3E depicts an example database table, range and proximity table 390, comprising example range and proximity records which may be comprised by database(s) 111*b*. Database tables 300, 340, 360, 380 and 390 are illustrative and many other implementations are possible.

In the example table of FIG. 3A, transportation table 300 may comprise transportation records which may comprise data associated with and/or representing transportation services in various scopes and stages of specification, execution and delivery within transportation network platform 100, such as transportation requests, transportation quotes, confirmed transportation requests, tentative vehicle assignments, vehicle assignments, transportation service events in progress, payments for rendered transportation services and completed transportation service events. Where a refueling event is planned in conjunction with a vehicle assignment, a transportation record may be associated with a vehicle refueling. A transportation record may be created by transportation management and fare processing module 114 of application and data services 110*a* upon an initiation of a transportation request, wherein a customer, such as customer 102, has begun entry of a transportation request. A transportation record may be modified at various points within a transportation service event process, such as that indicated by process 200, such as but not limited to, upon a creation of a transportation request, a transportation quote, a confirmed transportation request, a tentative vehicle assignment and a vehicle assignment. A transportation record may be modified by transportation management and fare processing module 114 to comprise data associated with transport of a customer/cargo which may transpire subsequent to a confirmed transportation request and a vehicle assignment and may include data associated with a customer/cargo pickup, customer/cargo drop off, a related fare, etc. A transportation record may be modified by transportation management and fare processing module 114 to comprise data associated with a refueling event which may transpire subsequent to a transportation customer/cargo drop off. As noted, FIG. 3A is illustrative, and many other implementations are possible. For example, a recording and accounting of rendered transportation services as provided by records of transportation table 300 may be implemented and organized as records of multiple tables, comprising, for example: a transportation request table which may comprise records associated with transportation requests, transportation quotes and confirmed transportation requests; a vehicle assignment table which may comprise records associated with tentative vehicle assignments, vehicle assignments and planned refueling events; and a customer/cargo transport table which may comprise records associated with customer/cargo pickup, customer/cargo transport, customer/cargo drop off and fare processing, wherein a combination of three associated records, namely, an associated transportation request record, an associated vehicle assignment record and an associated customer/cargo transport record may provide a recording and accounting of a rendered transportation service. In other possible implementations, vehicle assignment and customer/cargo transport records may be associated with transportation request records, and a combination of two associated records, namely, an associated transportation request record and an associated vehicle assignment and customer/cargo transport record may provide an accounting of a rendered transportation service. The forgoing examples of other possible implementations is not exhaustive and is illustrative of but a few of the many possible ways a transportation table 300, and/or arrangements of various database tables and their implementations are possible within the scope of the present application.

In an implementation, a transportation record of transportation table 300 of FIG. 3A may comprise the following data fields:

- a transportation_id 301 data field, which may uniquely identify a given transportation record and may be a primary key of transportation table 300;
- a customer(customer_id) 302 data field, which may be a foreign key linking to a record of a customer table (not shown) which may have customer_id as a primary key, may comprise customer records associated with customer accounts, and may uniquely identify and be associated with a customer making a transportation request for which a given transportation record may be created;
- a request_date_time 303 data field, which may be a time stamp recording of the date and time of an initiation of, in-process of, and/or submission of, a transportation request associated with a given transportation record;
- a cust_loc_at_rt(location_id) 304 data field, which may be a location of a customer as reported by a GPS device of a customer device of a customer at the time of a submission of a transportation request, wherein the customer may be submitting the transportation request via the customer device, and cust_loc_at_rt(location_id) 304 may be a foreign key linking to a record of location table 340 which may have a primary key location_id 341 and may comprise location records uniquely identified by location_id 341;
- a req_dest(location_id) 305 data field, which may be a destination location specified by a customer as part of a transportation request and a location to which a customer is requesting to be transported, and may be a foreign key linking to a record of location table 340 which may have a primary key location_id 341 and may comprise location records uniquely identified by location_id 341;
- a req_pickup_loc(location_id) 306 data field, which may be a location specified by a customer as part of a transportation request and a location at which a customer is requesting to be picked up, wherein this location may or may not be the same location as associated with cust_loc_at_rt(location_id) 304, and req_pickup_loc(location_id) 306 may be a foreign key linking to a record of location table 340 which may have a primary key location_id 341 and may comprise location records uniquely identified by location_id 341;
- a req_pickup_time 307 data field, which may be a time specified by a customer as part of a transportation request and a time at which a customer is requesting to be picked up, wherein this time may be a time later than request date time 303, wherein the customer is not requesting an immediate (or as soon as possible) pickup time;

a req_service(service_id) 308 data field, which may indicate a type of transportation service, such as but not limited to, a vehicle type and characteristics (luxury, standard, sedan, van, bus, air, ground, autonomous, electric, plugin hybrid, hybrid, gasoline, etc.), a number of passengers and/or cargo (one passenger, no passengers, two passengers, four passengers, etc. and/or one or more parcels/packages, food, cargo, wherein when no passengers are transported, a delivery service is provided), discounted shared ride services, etc., and may be a foreign key linking to a record of a service table (not shown) having a primary key service_id and comprising service type records uniquely identified by service_id records of the various service types which may be engaged and provided by the transportation network platform to customers thereof;

a route(route_id) 309 data field, which may specify a route which may be determined by route analysis and infrastructure management module 116, may be a route connecting req_pickup_loc(location_id) 305 and req_dest(location_id) 307, and may be a foreign key linking to a record of a routes table (not shown) having route_id as a primary key and comprising route records associated with transportation records;

a fare_quote 310 data field, which may be a fare quoted in a transportation quote for providing transportation services required to fulfill a transportation request (note: in some implementations wherein multiple quotes may be presented to customer 102 for multiple scenarios, such as multiple service types and/or potential destinations, transportation network platform 100 may maintain such multiple quotes and scenarios in a temporary table associated with a transportation record, wherein upon a selection of a specific quoted scenario, specifics of the chosen scenario, i.e. transportation request, may be populated in transportation record, e.g., fare_quote 310, may be populated with a fare of the selected scenario);

a pickup_loc_quote(location_id) 311 data field, which may be a pickup location specified in a transportation quote created in response to a transportation request and may typically be the same location as specified by req_pickup_loc(location_id) 305, but may be different due to constraints limiting pickups at req_pickup_loc (location_id) 305, and pickup_loc_quote(location_id) 311 may be a foreign key linking to a record of location table 340 which may have a primary key location_id 341 and may comprise location records uniquely identified by location_id 341;

a pickup_time_quote 312 data field, which may be a time specified in a transportation quote created in response to a transportation request and may be the same time as specified in req_pickup_time 306, but may be different due to an estimated arrival time of a vehicle assigned to the transportation request;

a dest_quote(location_id) 313 data field, which may be a quoted destination specified in a transportation quote and may typically be the location to which a customer is requesting to be transported as specified in req_dest (location_id) 307 of a transportation request, but may be different due to constraints limiting drop offs at req_dest(location_id) 307, and dest_quote(location_id) 313 may be a foreign key linking to a record of location table 340 which may have a primary key location_id 341 and may comprise location records uniquely identified by location_id 341;

a service_quote(service_id) 314 data field, which may indicate a type of transportation service specified in a transportation quote created in response to a transportation request, and may typically be the same service type specified in req_service(service_id) 308, but may be different due to constraints in providing the requested service type, and may be a foreign key linking to a record of a service table (not shown) having a primary key service_id and comprising service type records uniquely identified by service_id records of the various service types which may be engaged and provided by the transportation network platform 100 to customers thereof;

a tran_srvc_evnt(status_code_id) 315 data field, which may indicate a status of a transportation service event and may be a status code, wherein an example list of status codes may be as listed in Table 1 below:

TABLE 1

Transportation Service Event Status Codes

| Status Code | Status |
|---|---|
| 00 | Customer Transportation Request in Process |
| 01 | Transportation Quote Pending with Customer |
| 02 | Confirmed Transportation Request; Awaiting Vehicle Assignment |
| 03 | Vehicle Assigned |
| 04 | Driver-Vehicle in Transit to Customer |
| 05 | Transporting Customer/Cargo |
| 06 | Customer/Cargo Dropped Off and Payment Processed |
| 07 | Payment Error |
| 08 | Customer Aborted Transportation Request |
| 09 | Customer Canceled Confirmed Transportation Request Before Vehicle Assignment |
| 10 | Customer Canceled Confirmed Transportation Request After Vehicle Assignment |
| 11 | Driver Canceled Vehicle Assignment |
| 12 | Driver-Vehicle Service Issue Prior to Customer/Cargo Pickup |
| 13 | Driver-Vehicle Service Issue After Customer/Cargo Pickup | wherein, the above example list of status codes may be comprised by a database table, status codes table (not shown), comprised by database(s) 111b, and tran_srvc_evnt(status_code_id) 315 may be a foreign key linking to a record of a status codes table which may have a primary key (status_code_id) and may comprise status code records associated to the status codes illustrated in Table 1 above which may be uniquely identified by a primary key status_code_id;

a d-v(driver-vehicle_id) 316 data field, which may indicate a vehicle (and driver if not an autonomous vehicle, and in some implementations an owner/service provider of an autonomous vehicle) assigned to a transportation request and thereby may create a vehicle assignment associated with a given transportation record, and may be a foreign key linking to driver-vehicle table 360 having driver-vehicle_id 361 as a primary key and comprising driver-vehicle records associated with vehicle assignments, transportation service events and vehicle refueling events;

a d-v_loc_at_asgmt(location_id) 317 data field, which may be a location of d-v(driver-vehicle_id) 316 at the time a vehicle assignment is confirmed to a transportation request associated with a given transportation record, and may be a foreign key linking to a record of location table 340 which may have a primary key location_id 341 and may comprise location records uniquely identified by location_id 341;

a fuel_status_at_asgmt 318 data field, which may be a fuel status of d-v(driver-vehicle_id) 316 (e.g. fuel_status 368 of diver vehicle record identified by driver-vehicle_id 361) at the time a vehicle assignment is confirmed to a transportation request associated with a given transportation record;

a range_at_asgmt 319 data field, which may be a vehicle range of d-v(driver-vehicle_id) 316 (e.g. range_status 369 of diver vehicle record identified by driver-vehicle_id 361) at the time a vehicle assignment is confirmed to a transportation request associated with a given transportation record;

a refuel_evnt_plan(fuel_unit_id) 320 data field, which may indicate a planned refueling event which may be established in conjunction with a vehicle assignment, and may be a foreign key linking to fuel unit table 380 having fuel_unit_id 381 as a primary key and comprising fuel unit records associated with fuel units which may be used in refueling events which may be planned in conjunction with a vehicle assignment or otherwise used in actual refueling events;

a refuel_amount_min 321 data field, which may stipulate a minimum refueling amount of vehicle d-v(driver-vehicle_id) 316 required to satisfy a planned refueling event, namely refuel_evnt_plan(fuel_unit_id) 320, which may be scheduled in conjunction with a vehicle assignment;

a pickup_loc_actual(location_id) 322 data field, which may an actual pickup location of customer(customer_id) 302 and may typically be the same location as specified by pickup_loc_quote(location_id) 311, but may be different, and pickup_loc_quote(location_id) 311 may be a foreign key linking to a record of location table 340 which may have a primary key location_id 341 and may comprise location records uniquely identified by location_id 341;

a pickup_time_actual 323 data field, which may be a time specified in response to a transportation request and may be the same time as specified in req_pickup_time 306, but may be different due to an estimated arrival time of a vehicle assigned to the transportation request not being met;

a route_actual(route_id) 324 data field, which may be a route taken during a transport of a customer/cargo associated with the given transportation record, and may typically be the same route as specified by route (route_id) 309, but may be different, and route_actual (route_id) 324 may be a foreign key linking to a record of a routes table (not shown) having route_id as a primary key and comprising route records associated with transportation requests, assignments and events;

a dest_actual(location_id) 325 data field, which may be an actual destination and may typically be the destination to which a customer was a quoted as specified in dest_quote(location_id) 313, but may be different due various factors such as constraints limiting drop offs at dest_quote(location_id) 313 or a request made by customer(customer_id) 302 during the transportation service event to be dropped off at dest_actual(location_id) 325, and dest_actual(location_id) 325 may be a foreign key linking to a record of location table 340 which may have a primary key location_id 341 and may comprise location records uniquely identified by location_id 341;

a fare_actual 326 data field, which may be a fare which is charged for services rendered in a transportation service event and may typically be the fare of which a customer was a quoted as specified in fare_quote 310, but may be different due to various factors such as a request made by customer(customer_id) 302 during the transportation service event to be dropped off at a destination different from the quoted destination, namely, dest_actual(location_id) 325 is different than dest_quote(location_id) 313;

a refuel_unit_actual(fuel_unit_id) 327 data field, which may indicate an actual refueling event which may have been planned in conjunction with a vehicle assignment as specified in refuel evnt_plan(fuel_unit_id) 320, and may typically be associated with the same fuel unit associated with refuel evnt_plan(fuel_unit_id) 320, but may be different due to various factors such as a request made by customer(customer_id) 302 during the transportation service event to be dropped off at a destination different from the quoted destination or the fuel unit specified by refuel_evnt_plan(fuel_unit_id) 320 being unavailable at the time of refueling, wherein refuel_unit_actual(fuel_unit_id) 327 may be a foreign key linking to fuel unit table 380 having fuel_unit_id 381 as a primary key and comprising fuel unit records associated with fuel units which may be used in refueling events which may be planned in conjunction with a vehicle assignment or otherwise used in actual refueling events;

a refuel_amount_actual 328 data field, which may indicate an actual amount a vehicle is refueled during a refueling event associated with a planned refueling event which may be scheduled in conjunction with a vehicle assignment, and may be the same or different than the minimum refueling amount specified in refuel_amount_min 321;

a fuel_status_at_refuel_evnt 329 data field, which may be a fuel status preceding an actual refueling event as specified in refuel_unit_actual(fuel_unit_id) 327; and a range_at_refuel_evnt 330 data field, which may be a vehicle range preceding an actual refueling event as specified in refuel_unit_actual(fuel_unit_id) 327.

In the example table of FIG. 3B, location table 340 may comprise location records associated with a location which may be specified for various types of locations, such as but not limited to those locations associated with the following data fields of transportation table 300, wherein a primary key of location table 340, location_id 341, and the following data fields of transportation table 300 are associated therewith as foreign keys:

```
cust_loc_at_rt(location_id) 304;
req_dest(location_id) 305;
req_pickup_loc(location_id) 306;
pickup_loc_quote(location_id) 311;
dest_quote(location_id) 313;
d-v_loc_at_asgmt(location_id) 317;
pickup_loc_actual(location_id) 322; and
dest_actual(location_id) 325.
```

As will be described later herein, location_id 341 is a foreign key of tables other table, such as driver-vehicle table 360, fuel unit table 380, range and proximity table 390 and location table 340 itself.

A location record may be created and/or modified by various software modules of application and data services 110*a* in conjunction with data services module 111*a*, such as transportation management and fare processing module 114, vehicle assignment and fleet management module 115 and route analysis and infrastructure management module 116 of application and data services 110*a*. As noted, FIG. 3B is illustrative, and many other possible implementations of location table 340, and/or arrangements of various database tables and their implementations are possible within the scope of the present application.

In an implementation, a location record of location table 340 may comprise the following data fields:

- a location_id 341 data field, which may uniquely identify a given location record and may be a primary key of location table 340;
- a coordinates 342 data field, which may comprise a longitudinal coordinate and latitudinal coordinate specifying a given location;
- an address 343 data field(s), which may comprise multiple subfields, such as a street number, street and city relating to a street address specifying a given location;
- a venue_name 344 data field, which may specify a name(s) associated with a location of a given location record of location table 340, such as a hotel name, a restaurant name, an airport name and the like;
- a restrictions 345 data field, which may specify none or more restrictions for which a knowledge thereof may be useful in a pickup or drop off attempt associated with a transportation service event, such as a restriction of a vehicle height, a restriction on the standing time of a vehicle and the like;
- an instructions 346 data field, which may specify none or more instructions for which a knowledge thereof may be useful in a pickup or drop off attempt associated with a transportation service event, such a landmark for assisting in navigation to or from a pickup and/or drop off point, a phone number for notification of guest arrivals and/or arrival of transportation for guest pickups and the like;
- a spec_pickup_loc(location_id) 347 data field, which may be a specified location for pickup and having different coordinates as those specified in coordinates 342 for a given record, wherein transportation network platform 100 may make a substitution to ensure a proper location is used for pick up, wherein for example, a customer 102 of customer(customer_id) 302 may specify a requested pickup location in req_pickup_loc(location_id) 304, and transportation network platform may determine from accessing a location record associated with req_pickup_loc(location_id) 305 that a different location, identifiable here as location_id as shown in bold italics, is specified for pick up, wherein location_id of spec_pickup_loc(location_id) 347 may be quoted in pickup_loc_quote(location_id) 311, thereby informing customer 102 and an assigned vehicle of a proper pickup location consistent with a pickup location specified in spec_pickup_loc(location_id) 347;
- a spec_drop_off_loc(location_id) 348 data field, which may be a specified location for drop off and having different coordinates as those specified in coordinates 342 for a given record, wherein transportation network platform 100 may make a substitution to ensure a proper location is used for drop off, wherein for example, a customer 102 of customer(customer_id) 302 may specify a requested destination location in req_dest(location_id) 307, and transportation network platform may determine from accessing a location record associated with req_dest(location_id) 307 that a different location, identifiable here as location_id as shown in bold italics, is specified for drop off, wherein location_id of spec drop off loc(location_id) 348 may be quoted in pickup_loc_quote(location_id) 311, thereby informing customer 102 and an assigned vehicle of a proper drop off location consistent with a drop off location specified in spec_drop_off_loc(location_id) 348; and
- an alt_loc(location_id) 349 data field, which may and alternate location for pick up and/or drop off, such as for a vehicle exceeding height requirements or vehicle standing time requirements.

In the example table of FIG. 3C, driver-vehicle table 360 may comprise driver-vehicle records associated with vehicles and vehicle drivers or owners/operators as may be the case for autonomous vehicles. The driver-vehicles represented in records comprised by driver-vehicle table 360 when taken as a whole, may represent the transportation service fleet which may be considered by transportation network platform 100 when facilitating a transportation service event in conjunction with a transportation request. A driver-vehicle record may be created by driver and vehicle account management module 113*b* of application and data services 110*a* and may be modified thereby, or may be modified by vehicle assignment and fleet management module 115 of application and data services 110*a*. Driver-vehicle table 360 may comprise driver-vehicle records associated with a vehicle having an associated driver and/or owner, wherein the vehicle may be engaged, in association with a driver and/or an owner/operator, by the transportation network and may be assigned thereby to provide transportation services to customers of the transportation network. Driver-vehicle_id 361 may be a primary key of driver-vehicle table 360, and data field d-v(driver-vehicle_id) 316 of transportation table 300 may be associated therewith as a foreign key reference to driver-vehicle_id 361 thereby associating a driver-vehicle record comprised by driver-vehicle table 360 to a transportation record of transportation table 300. For example, d-v(driver-vehicle_id) 316 may associate a driver vehicle record to a transportation record of transportation table 300, and thereby may indicate a vehicle assignment of a vehicle of such driver vehicle record to a transportation request which may be specified in such transportation record. As noted, FIG. 3C is illustrative, and many other implementations of driver-vehicle table 360, and/or arrangements of various database tables and their implementations are possible within the scope of the present application.

In an implementation, a driver-vehicle record of driver-vehicle table 360 may comprise the following data fields:

- a driver-vehicle_id 361 data field, which may which may uniquely identify a given driver-vehicle record and may be a primary key of driver-vehicle table 360;
- a driver(driver_id) 362 data field, which may indicate a driver if the driver-vehicle record is not associated with an autonomous vehicle, and in some implementations may indicate an owner/service provider of an autonomous vehicle associated with the driver-vehicle record;
- a vehicle(vehicle_id) 363 data field, which may indicate a vehicle associated with the driver-vehicle record;
- a fuel_type 364 data field, which may indicate a fuel type of a vehicle associated with the driver-vehicle record, such as electric, gas, plugin hybrid and the like;
- a veh_service_type(service_id) 365 data field, which may indicate a service type of a vehicle associated with the driver-vehicle record, such as ground vehicle, ground compact vehicle, ground van vehicle, air vehicle single passenger, air vehicle parcel only (and parcel size-weight classification), air vehicle multi passenger (and passenger/cargo classification), and the like;
- a vehicle_availability 366 data field, which may indicate an availability of a vehicle (and driver if not autonomous) to accept or consider accepting an assignment;

a vehicle_location(location_id) 367 data field, which may indicate a current location or a generally recently assessed location of a vehicle, and a vehicle location (location_id) 367 may be a foreign key linking to a record of location table 340 which may have a primary key location_id 341 and may comprise location records uniquely identified by location_id 341;

a fuel_status 368 data field, which may indicate an estimated or actual fuel status of a vehicle;

a range_status 369 data field, which may indicate an actual or estimated vehicle range of a vehicle;

a fuel_range_conversion 370 data field, which may indicate a minimum fuel level or minimum range allowable in conjunction with a completion of a prospective vehicle assignment, wherein such completion may include travel to a prospective refueling event planned in conjunction with the prospective vehicle assignment;

a pref_fuel_unit(fuel_unit_id) 371 data field, which may indicate a preferred fuel unit of the driver if the driver-vehicle record is not associated with an autonomous vehicle, and in some implementations may indicate a preferred fuel unit of an owner/service provider of an autonomous vehicle associated with the driver-vehicle record; and a refuel_evnt(status_code_id) 372 data field, which may indicate a status of a refueling event associated with a driver-vehicle of a given record, wherein an example list of status codes may be as listed in Table 2 below:

TABLE 2

Refueling Event Status Codes

| Status Code | Status |
| --- | --- |
| 60 | Scheduled Refueling Event Not Pending/Prior Scheduled Refueling Event Satisfied |
| 61 | Scheduled Refueling Event Pending |
| 62 | Refueling Event in Progress |
| 63 | Refueling Issue-No Fuel Unit Available |
| 64 | Refueling Issue-Partial Refueling (Not Meeting Planned Amount) | wherein, the above example list of status codes may be comprised by a database table, status codes table (not shown), comprised by database(s) 111b, and refuel_evnt(status_code_id) 372 may be a foreign key linking to a record of a status codes table which may have a primary key (status_code_id) and may comprise status code records associated to the status codes illustrated in Table 2 above which may be uniquely identified by a primary key status_code_id.

In the example table of FIG. 3D, fuel unit table 380 may comprise fuel unit records associated with fuel units which may be specified in refuel evnt_plan(fuel_unit_id) 320 as fuel units planned for use in planned refueling events, and may be specified in refuel_unit_actual(fuel_unit_id) 327 as fuel units used in actual refueling events. The fuel units represented in records comprised by fuel unit table 380 when taken as a whole, may represent the fuel units which may be considered by transportation network platform 100 when planning a refueling event in conjunction with a vehicle assignment. Fuel unit records may be created by route analysis and infrastructure management module 116 of application and data services 110a upon a submission request therefore, which may be submitted by an operator using an operator device, such as operator device 190, or in some implementations, a third party fueling service may have an ability to maintain fuel unit records associated with a plurality of fuel units within their span of operations. A fuel unit record may be modified, such as modified to reflect a change in status, (such as available, in use, etc.). Fuel_unit_id 381 may be a primary key of fuel unit table 380, and data fields refuel evnt_plan(fuel_unit_id) 320 and refuel unit actual(fuel_unit_id) 327 of transportation table 300, and data field pref_fuel_unit(fuel_unit_id) 371 of driver-vehicle table 360 may be associated therewith as foreign key references to fuel_unit_id 381 thereby associating a fuel unit record comprised by fuel unit table 380 to a transportation record of transportation table 300 and/or a driver-vehicle record of driver-vehicle table 360, respectively. As noted, FIG. 3D is illustrative, and many other possible implementations of fuel unit table 380, and/or arrangements of various database tables and their implementations are possible within the scope of the present application.

In an implementation, a fuel unit record of fuel unit table 380 may comprise the following data fields, wherein for a given fuel unit record such data fields may be as follows:

a fuel_unit_id 381 data field, which may uniquely identify the given fuel unit record associated with a fuel unit, such as an electric vehicle charging station or a gasoline fuel pump, and may be a primary key of fuel unit table 380;

a fuel_unit_loc(location_id) 382 data field, which may indicate a location of the fuel unit associated with the given fuel unit record, and may be a foreign key linking to a record of location table 340 which may have a primary key location_id 341 and may comprise location records uniquely identified by location_id 341;

a fuel_srvcs(fuel_services_id) 383 data field, which may indicate the types of fuel services provided by the fuel unit associated with the given fuel unit record, or in some implementations, may be a foreign key linking to a record of a fuel services table (not shown) having fuel_services_id as a primary key and comprising fuel services records indicating fuel service profiles, wherein a fuel service profile may be associated with a fuel unit to indicate the type(s) of fuel service(s) provided by the fuel unit;

a fuel_oper(fuel_operator_id) 384 data field, which may indicate a service provider/operator of the fuel units, or in some implementations, may be a foreign key linking to a record of a fuel services operator table (not shown) having fuel operator_id as a primary key and comprising fuel services operator records indicating fuel service operator profiles, wherein a fuel service operator profile may be associated with a fuel unit to indicate what service provider owns and/or operates the fuel unit of a given fuel unit record;

a fuel_unit(status_code_id) 385 data field, wherein an example list of status codes may be as listed in Table 3 below:

TABLE 3

Fueling Unit Status Codes

| Status Code | Status |
| --- | --- |
| 80 | Fueling Unit Available |
| 81 | Fueling Unit In Use |
| 82 | Fueling Service Type 1 Available |
| 83 | Fueling Service Type 2 Available |
| 84 | Fueling Service Type 3 Available |

TABLE 3-continued

Fueling Unit Status Codes

| Status Code | Status |
|---|---|
| 85 | Fueling Service Type 4 Available |
| 86 | Fueling Service Type 5 Available |
| 87 | Fueling Service Type 6 Available |
| 88 | Fueling Unit Not In Operation | wherein, the above example list of status codes may be comprised by a database table, status codes table (not shown), comprised by database(s) 111*b*, and fuel_unit(status_code_id) 385 may be a foreign key linking to a record of a status codes table which may have a primary key (status_code_id) and may comprise status code records associated to the status codes illustrated in Table 3 above which may be uniquely identified by a primary key status_code_id;

a facility(facility_id) 386 data field, which may indicate a facility in which the fuel unit is located, or in some implementations, may be a foreign key linking to a record of a fuel facility table (not shown) having facility_id as a primary key and comprising facility records indicating facility profiles, wherein a facility profile may be associated with a fuel unit to indicate details related to the facility (e.g., total number or fuel units by type of fuel unit, total number of available fuel units by type of fuel unit, optimal entrance into facility, air vehicle landing pads details, etc.); and a local_unit_number 387 data field, which may indicate a number for a fuel unit within a facility, wherein such a number may be displayed on a fuel unit.

In the example table of FIG. 3E, range and proximity table 390 may comprise range and proximity records associated with required minimum remaining ranges which may be usable to determine if a vehicle may be safely assigned to a transportation request, and range margins which may be usable to determine if a vehicle requires refueling. Range and proximity table 390 may comprise range and proximity records associated proximity distances which may be useable to determine if a vehicle is within a service area of a transportation request and thereby may be considered for a vehicle assignment thereto. Range and proximity records may be comprise geographic zone data fields and time and day data fields such that ranges and proximities may be maintained and vary by geographic location and time and day. As noted, FIG. 3E is illustrative, and many other possible implementations of range and proximity table 390, and/or arrangements of various database tables and their implementations are possible within the scope of the present application.

In an implementation, a range and proximity record of range and proximity table 390 may comprise the following data fields, wherein for a given range and proximity record such data fields may be as follows:

a range_proximity_id 391 data field, which may uniquely identify the given range and proximity record, and may be a primary key of range and proximity table 390;

a geographic_zone(location_id) 392 data field, which may indicate a geographic zone, and may be a foreign key linking to a record of location table 340 which may have a primary key location_id 341 and may comprise location records uniquely identified by location_id 341, wherein a geographic location may be associated with range and proximity record and indicate an associated location or zone wherein a range and proximity record may be applicable;

a time_day(day_part_id) 393 data field, which may indicate a day parting profile useable to identify, relate and/or maintain range and proximity records by time or day, day of week, day of year, etc., and may be a foreign key linking to a record of a day parting table (not shown) having day_part_id as a primary key and comprising day parting records indicating day parting profiles, wherein a day parting profile may be associated with range and proximity record and indicate an associated day and time wherein a range and proximity record may be applicable;

a range_margin 394 data field, which may specify a range margin associated with a given range and proximity record, and may be usable to determine if a vehicle requires refueling;

a min_rmng_range 395 data field, which may specify a required minimum remaining range associated with a given range and proximity record, and may be usable to determine if a vehicle may be safely assigned to a transportation request;

a proximity_distance_limit 396 data field, which may specify a proximity distance limit associated with a given range and proximity record, and may be useable to determine if a vehicle is within a service area of a transportation request; and a proximity_distance_increment 397 data field, which may specify a proximity distance increment associated with a given range and proximity record, and may be useable to increment a selection criteria when selecting candidate vehicle for assignment within a service area of a transportation request.

Figure 4A:
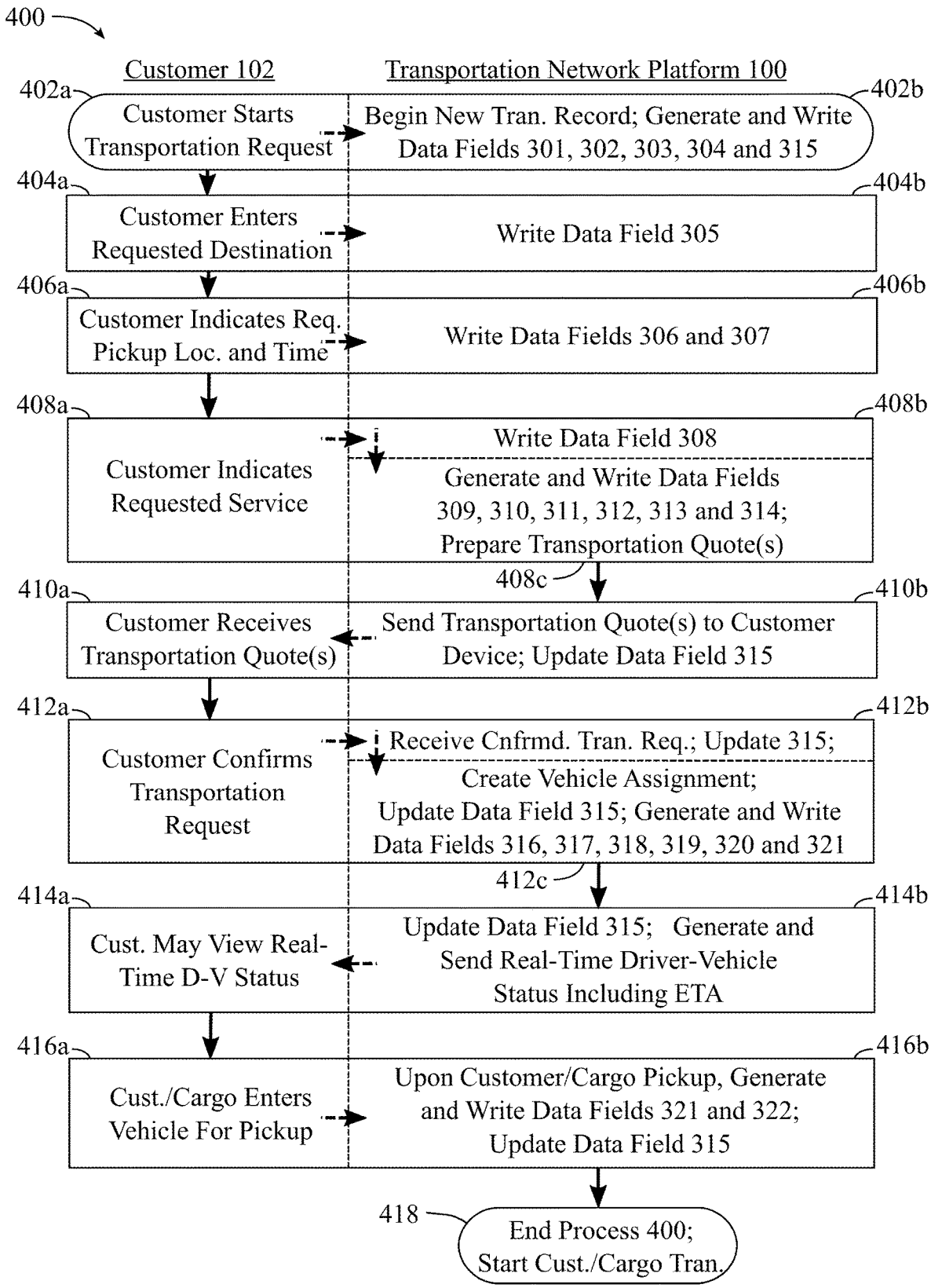
FIG. 4A depicts a flow diagram of an example process comprising a customer transportation request and a customer/cargo pickup.

FIG. 4A depicts a flow diagram of an example process 400 comprising a customer transportation request and a customer/cargo pickup, wherein process 400 begins with a customer, such as customer 102, starting a transportation request and completes when customer/cargo has entered a vehicle for customer/cargo pickup and a start of customer/cargo transportation. As depicted in FIG. 4A, process steps which may be performed by customer 102 to enter and submit information corresponding to a transportation request and book transportation leading to a start of a transportation service event are illustrated on the left side of process 400 in FIG. 4A, and associated process steps which may be performed by server based system 110 of transportation network 100 to receive, generate and record corresponding data of a transportation record of table 300 of FIG. 3A comprising transportation service event data such as that which may be associated to and represent a transportation request, a transportation quote, a confirmed transportation request and a vehicle assignment which may lead to a start of a transportation service event are illustrated on the right side of process 400 in FIG. 4A. Also referring to FIG. 1A, customer 102 may be located at a customer location 172 on a customer route 172*a*, may be using a customer device such as customer device 120 and may be therewith logged into a customer account comprised by server based system 110 to which customer 102 may be associated. Also referring to FIG. 1C, entry of information by customer 102 may be made via user interface 144 of customer device 120. In some implementations, depending on the particular type of customer device (e.g. smartphone, tablet, laptop, smartwatch, etc.) entry of information may be made by touching a touchscreen, clicking on a displayed image and/or typing keys of user interface 144. In some implementations, entry of at least some information may be verbally entered, wherein customer 102 speaks such information and customer device 120 and/or server based system 110 utilizes speech recognition and natural language processing to translate such spoken information to required data formats. In example process 400 of FIG. 4A, customer 102 may use customer device 120 to interact with server based system 110 to generate and confirm a transportation request, wherein customer device application interface 121 of customer device 120 may communicate with customer application systems interface 112a of application and data services 110a of server based system 110 via communications link 182, communications network 180 and communications link 181.

Also referring to FIG. 1B, FIG. 1C and FIG. 3A, customer application logic 122 of customer device 120, customer account management module 112a and transportation management and fare processing module 114 may facilitate customer entry of a transportation request, wherein customer 102 may in step 402a of process 400 begin entry and submission of a transportation request, whereupon in step 402b transportation management and fare processing module 114 and data services 111a may create, and begin writing data to data fields of, a new transportation record of transportation table 300 which may be comprised by database(s) 111b and may include data fields transportation_id 301, customer(customer_id) 302, request_date_time 303 and cust_loc_at_rt_(location_id) 304. In some implementations, request_date_time 303 data field may be a time stamp recording of the date and time of an initiation of a transportation request associated with a given transportation record; in some implementations, request_date_time 303 data field may be a time stamp recording of the date and time at a point within a process of entering a transportation request associated with a given transportation record; and/or in some implementations, request_date_time 303 data field may be a time stamp recording of the date and time of a submission of a transportation request associated with a given transportation record. In some implementations, request_date_time 303 data field may be initialized and modified during a process of customer 102 entering a transportation request associated with a given transportation record, and may be useful in determining a time of a last customer action of customer 102 in an entry within a transportation request process. As customer 102 and transportation network platform 100 proceed in process 400, transportation management and fare processing module may in conjunction with data services 111a initialize, and update tran_srvc_evnt(status_code_id) 315 data field to reflect a status of process 400 using status codes which may include those described in Table 1, Transportation Service Event Status Codes. In step 402a where customer 102 has started a transportation request entry, in step 402b transportation network platform 100 in conjunction with data services 111a may set an initial value for tran_srvc_evnt(status_code_id) 315 data field in the new transportation record begun in step 402b to status code 00, "customer transportation request in process".

In step 404a, customer 102 may enter a requested destination, such as destination 179 and/or destination location 178, via user interface 124 of customer device 120, and in response to such entry, in step 404b, transportation management and fare processing module 114 and data services 111a may write to database(s) 111b the entered data to a req_dest (location_id) 305 data field in the new transportation record begun in step 402b. In some implementations, entry of a requested destination by customer 102 may be accomplished by one or more various methods, such as entry of an explicit address, entry of an intersection of roadways, entry of a venue name, a touching of a location on a displayed map, a selection of one of a list of one or more prior destinations sought by customer 102, and the like. In some implementations, transportation network platform may generate a list of one or more prior destinations for presentation to customer 102 by using a current location 172 of customer 102 (as may be reported via a GPS device of customer device 120) to search previous confirmed transportation requests of customer 102 recorded in table 300 in database(s) 111b and select a number of most frequent destinations, namely req_dest(location_id) 305 data fields of transportation records associated with customer(customer_id) of customer 102 when initiated by customer 102 from or near to customer location 172, namely cust_loc_at_rt(location_id) 304. Such most frequent destinations can be further selected in association with a time of day range in association with the current time. In some implementations, transportation network platform 100 may facilitate a display on customer device 120 of a selectable list of such most frequent destinations, wherein customer 102 may conveniently select a desired destination from the selectable list and thereby enter a requested destination. For example, a list prior destinations meeting the aforementioned criteria when present in database(s) 111b in association with one or more transportation records can be presented to customer 102 in a priority order of the total number of such association to one or more transportation records. In some implementations, a customer 102 may, previous to process 400, input one or more favorite destinations which may be displayed as a selectable list of such favorite destinations, wherein customer account management module 112b in conjunction with data services 111a may store such favorite destinations in customer profile data in a customer account of customer 102 in database(s) 111b for later retrieval, display and possible selection by customer 102 in step 404a.

In step 406a, customer 102 may indicate a requested pickup location and time, and in response to such entry, in step 406b, transportation management and fare processing module 114 and data services 111a may write to database(s) 111b the indicated data to a req_pickup_loc(location_id) 306 data field and a req_pickup_time 307 data field in the new transportation record begun in step 402b. In some implementations customer 102 may indicate a pickup location to be a current location (as may be reported as a GPS location as determined by platform services and devices 123 of a customer device 120) and/or that a pickup time be a current time (or as soon as possible), or customer 102 may alternatively enter such a pickup location and/or pickup time via user interface 124 of customer device 120. For example in some implementations, entry of a requested pickup location by customer 102 may be accomplished by one or more various methods, such as but not limited to, entry of an explicit address, entry of a venue name, a selection of one of one or more listed prior pickup locations sought by customer 102 (wherein similar to the above disclosed method for generating a list of prior destinations associated with customer 102, previous confirmed transportation requests of customer 102 recorded in table 300 in database(s) 111b are searched for frequent pickup locations, namely req_pickup_loc(location_id) 306 data fields of transportation records associated with customer(customer_id) of customer 102 when booked from customer location 172, namely cust_loc_at_rt(location_id) 304, or a close proximity thereto) and the like, and entry of a pickup time may be an entry of a current time, an explicit time or a selection from one or more listed times or ranges of time (e.g. now; as soon as possible, 3:00 PM, 3:15 PM, 3:00 PM-3:10 PM, etc.) and the like. Transportation management and fare processing module 114 and route analysis and infrastructure management module 116 of transportation network 100 may conduct a validation of an entered pickup location and time based on a current time and a current location of customer device 120 which may be determined by a GPS location reported thereby. Where a disparity between a requested pickup location and a current location exists and a time difference between a requested pickup time and a current time is not sufficient to allow customer 102 to be at the requested pickup location at the requested time, transportation network 100 may attempt to resolve disparity. For example, transportation network platform 100 may display a message to customer 102 indicating a correction of an entry is required, or some other action to resolve the disparity (e.g., indicate that the transportation request is for a passenger having a pickup location at the entered pickup location and not the current customer 102 location, is for a parcel delivery transportation request having a pickup location of the entered pickup location and not the current customer 102 location, etc.).

In step 408*a*, customer 102 may indicate a requested service or service type, such as for example: a ground service or an air service; a class or type of vehicle (e.g. compact, luxury, van, etc.); transportation of one person, transportation of two persons, transportation of a group of persons, transportation of up to a specified number of persons or parcel pickup and delivery; and the like. In step 408*b*, transportation management and fare processing module 114 and data services 111*a* may write to database(s) 111*b* the indicated service type data to a req_service(service_id) 308 data field in the new transportation record begun in step 402*b*.

In step 408*c*, transportation management and fare processing module 114 may examine data fields req_dest(location_id) 305, req_pickup_loc(location_id) 306, req_pickup_time 307 and req_service(service_id) 308 associated with data submitted by customer 102 in steps 404, 406 and 408 which may form a transportation request, and determine a transportation quote. A transportation quote may provide a quoted fare and may provide as quoted values of the transportation quote the same destination, pickup location, pickup time and service type as indicated by customer 102, or may provide one or more differing values thereof to address constraints in fulfilling a transportation request. For example, transportation management and fare processing module 114 may query vehicle assignment and fleet management module 115 and determine a requested service may not be available near a requested pickup location at a requested pickup time (e.g., no compact car service is available), and an alternate service may be quoted in a transportation quote, wherein transportation management and fare processing module 114 and data services 111*a* may write to database(s) 111*b* a quoted service type in data field service_quote(service_id) 314 which may or may not match req_service(service_id) 308 of a transportation request depending on availability of a service type. In some implementations, transportation management and fare processing module 114 may, prior to a specification of a service type by customer 102, or in addition thereto, generate a plurality of quotes based on a plurality of service types having the specified pickup location and destination (and in some implementations, may be at least partially based on a specified pickup time and/or service types of vehicles projected to be in vicinity of the specified pickup location) and display a list of such service types and the fares associated thereto, wherein customer 102 may easily review available service types and weigh the cost thereof against the various merits of service types displayed.

In step 408*c*, transportation management and fare processing module 114 may call route analysis and infrastructure management module 116 to determine if any constraints may exist regarding a requested pickup location, req_pickup_loc(location_id) 306, and/or a requested destination, req_dest(location_id) 305, wherein one or both quoted corresponding values thereof, namely pickup_loc_quote(location_id) 311 and dest_quote(location_id) 313, may or may not match corresponding requested values (e.g. a response may comprise a quoted pickup at "baggage claim door 6" and not a pickup at "departures door 3" submitted in a transportation request). Route analysis and infrastructure management module may examine a location record in location table 340 (FIG. 3B) having coordinates 342, an address 343 and/or a venue_name 344 associated with a customer transportation request, i.e. req_dest(location_id) 305 and req_pickup_loc(location_id) 306, and may determine constraints associated with a requested destination or pickup location, and may determine a specific pickup location and/or drop off location is specified in spec_pickup_loc (location_id) 347 and/or spec_drop_off_loc(location_id) 348, respectively, and/or may determine another alternate location is specified in alt_loc(location_id) 349, wherein for example, a particular service type (e.g. large van or bus) may be required to use an alternate location. Depending on constraints if found, transportation management and fare processing module 114 and data services 111*a* may write to database(s) 111*b* a matching or different pickup location value as requested to pickup_loc_quote(location_id) 311 data field in the new transportation record begun in step 402*b*. Depending on constraints if found, transportation management and fare processing module 114 and data services 111*a* may write to database(s) 111*b* a matching or different destination value as requested to dest_quote(location_id) 313 data field in the new transportation record begun in step 402*b*.

In step 408*c* transportation management and fare processing module 114 may call route analysis and infrastructure management module 116 to determine a cost factor associated with the transportation request. A cost factor may be based on a distance and/or time required to travel from a quoted pickup location to a quoted destination. In some implementations, a cost factor associated with a transportation request may be affected by current and/or anticipated traffic patterns along potential routes. Route analysis and infrastructure management module 116 may analyze one or more potential routes to determine a route having a lowest cost factor. Transportation management and fare processing module 114 may use a determined lowest cost factor at least in part to prepare a fare quote to be charged in conjunction with a transportation services quoted to fulfill a transportation request and in conjunction with data services 111*a* write the fare quote to a fare_quote 310 data field and a route having a lowest cost factor to route(route_id) in the new transportation record begun in step 402*b*. In some implementations, other methods may be used to calculate fare quotes, such as a zone system method, wherein a geographic service area may be broken up into geographic zones, and travel within each zone may have a given fare basis, and travel between the combinations of various zones may each have a given fare basis which may be used at least in part to determine a fare quote. In some implementations, fares between certain locations may have a set, predetermined rate schedules, such as a fare from an airport baggage claim door to a given hotel front lobby door may have a predetermined fare schedule.

In step 408c, route analysis and infrastructure management module 116 may generate an estimated pickup time based at least in part based on an survey of available vehicles in a proximity of a quoted pickup location, namely, pickup_loc_quote(location_id) 311 data field, and in conjunction with data services 111a write the pickup time quote to a pickup_time_quote 312 data field in the new transportation record begun in step 402b. In step 408b, transportation management and fare processing module 114 may use data fields route(route_id) 309, fare_quote 310, pickup_loc_quote(location_id) 311, pickup_time_quote 312, dest_quote(location_id) 313 and service_quote(service_id) 314 to generate a transportation quote to be sent to customer device 120 for consideration by customer 102 in response to a transportation request therefrom. As discussed earlier, in some implementations more than one transportation quote may be provided having a variable as to service type.

Process 400 may continue to step 410b, wherein transportation network platform 100 may send the transportation quote generated in step 408c to customer device 120 of customer 102 and in conjunction with data services 111a may update tran_srvc_evnt(status_code_id) 315 data field in the new transportation record begun in step 402b to status code 01, "transportation quote pending with customer". In step 410a, customer 102 receives a transportation quote(s) (note that multiple quotes may be sent to reflect a plurality of service type options and fares related thereto). In step 412a, customer 102 may confirm a transportation request based on a received transportation quote of step 410a. Note that customer 102 may not confirm in 412a (not shown in FIG. 4A) as can be seen in step 206 of FIG. 2A, and a transportation request process may be aborted without a confirmed transportation request. Note that customer 102 may cease activity related to process 400 at other points (not shown) in process 400 between step 402a and step 412a, wherein process 400 may be aborted without a completed transportation request and/or a confirmed transportation request. In the case where customer 102 continues process 400 and confirms a transportation request in step 412a (as depicted in the illustrated process 400 of FIG. 4A), transportation network platform 100 in conjunction with data services 111a may in step 412b update tran_srvc_evnt (status_code_id) 315 data field in the new transportation record begun in step 402b to status code 02, "customer confirmed transportation request; awaiting vehicle assignment".

In step 412c, transportation management and fare processing module 114 may call vehicle assignment and fleet management module 115 to create a vehicle assignment in a process of which an example vehicle assignment process 430 will be described in the present disclosure in conjunction with an illustrated process flow chart thereof depicted in FIG. 4B, wherein, and as depicted in step 412c of FIG. 4A, transportation network platform 100 in conjunction with data services 111a may in step 412c generate and write data fields d-v(driver-vehicle_id) 316, d-v_loc_at_asgmt(location_id) 317, fuel_status_at_asgmt 318, range_at_asgmt 319, refuel_evnt_plan(fuel_unit_id) 320 and refuel_amount_min 321 in the new transportation record begun in step 402b, and may update tran_srvc_evnt(status_code_id) 315 in the new transportation record begun in step 402b to status code 03, "vehicle assigned"

In step 414b upon a vehicle assignment and an assigned driver-vehicle beginning a transit towards a customer/cargo pickup location, transportation network platform 100 in conjunction with data services 111a may update tran_srvc_evnt(status_code_id) 315 in the new transportation record begun in step 402b to status code 04, "driver-vehicle in transit to customer". In step 414b, transportation management and fare processing module 114 may generate and send real-time driver-vehicle status information of a confirmed assigned vehicle to customer device 120. In step 414a, customer 102 may view and monitor such driver-vehicle status. Such driver-vehicle status may comprise a current location of the assigned vehicle, an estimated time of arrival (ETA) at the quoted customer/cargo pickup location, pickup_loc_quote(location_id) 311, and a description of the assigned vehicle of the vehicle assignment created in step 412b.

In step 416a, customer 102 may enter the assigned vehicle for a customer/cargo pickup associated with the vehicle assignment. In step 416b, transportation management and fare processing module 114 may in conjunction with data services 111a write to database(s) 111b data fields pickup_loc_actual(location_id) 322 and pickup_time_actual 323 in the new transportation record begun in step 402b, and may update data field tran_srvc_evnt(status_code_id) 315 therein to 05 "Transporting Customer/Cargo". Recording of actual pickup times and locations may be useful in processing transportation records of completed transportation service events to determine performance metrics and operational trends and anomalies. For example, a quote to actual pickup time having a ratio as close to one may be desirable as it indicates an on-time pickup that is not early or late. If a large percentage of pickups are early, transportation management and fare processing module 114 may be adjusted to be more aggressive in quoting pickup times. Likewise, if a large percentage of pickups are late, transportation management and fare processing module 114 may be adjusted to be less aggressive in quoting pickup times.

Figure 4B:
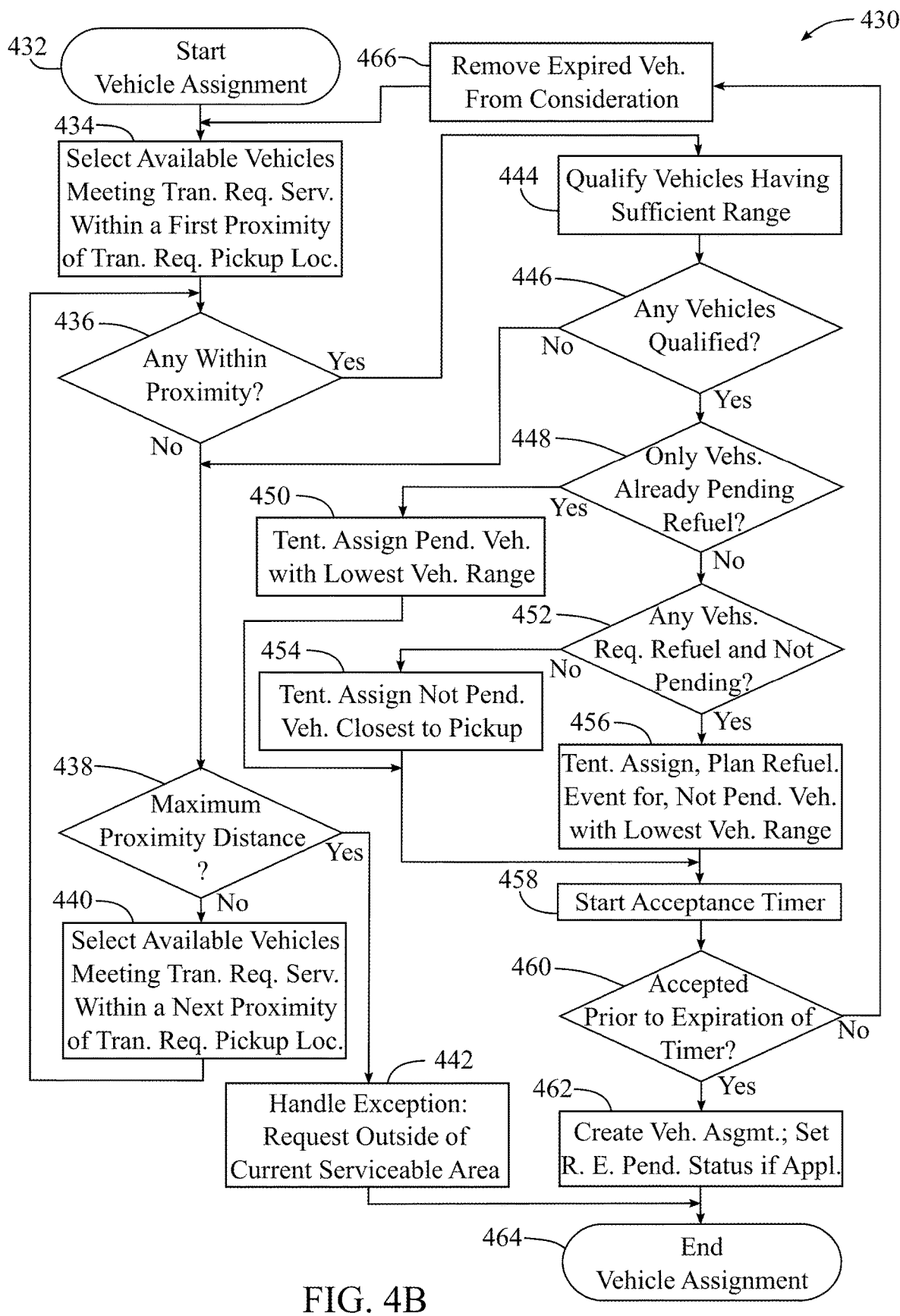
FIG. 4B depicts a flow diagram of an example process of assigning a vehicle to a transportation request.

FIG. 4B depicts a flow diagram of an example process 430 of creating a vehicle assignment to a transportation request. Also referring to step 206 and step 210 of FIG. 2A, wherein customer 102 confirms a transportation request and transportation network platform 100 makes a tentative vehicle assignment, respectfully, process 430 begins at step 432, start create vehicle assignment, which may be a starting point of step 210 of FIG. 2A. As such, in the context of FIG. 2A, the location of process 430 may be seen within a transportation service event process 200. Similarly referring to step 412a and step 412c of FIG. 4A, wherein customer 102 confirms a transportation request and transportation network platform 100 creates a vehicle assignment, respectfully, process 430 begins at step 432, start create vehicle assignment, which may be a starting point of step 412c of FIG. 4A. As such, in the context of FIG. 4A, the location of process 430 may be seen within process 400.

In step 434, vehicle assignment and fleet management module 115 of application and data services 110a of server based system 110 of transportation network platform 100, may in conjunction with data services 111a select from driver-vehicle table 360 of database(s) 111b a list of vehicles of driver-vehicle records associated with driver-vehicle ids 361 which satisfy a transportation request service (e.g. veh_service_type(service_id) 365 is the same as service_quote(service_id) 316), have an availability for assignment as indicated by vehicle_availability 366 and have a location as indicated by vehicle_location(location_id) 367, wherein such location is within a first proximity distance of a transportation request pickup location as indicated by pickup_loc_quote(location_id) 311 of a given transportation record of transportation table 300 associated with transportation_id 301 for which a vehicle assignment is being created. In some implementations, a proximity distance, such as a first proximity distance, may be a linear distance in travel length and/or an estimated travel time thereof, or a route distance in travel length and/or an estimated travel time thereof, and may be a first proximity distance chosen to yield a first desired response time to a transportation request or other such service related metric of transportation network platform 100. In some implementations, a first proximity distance will be less than or equal to a maximum proximity distance, where a maximum proximity distance will be discussed later herein.

In a first entry into step 436, vehicle assignment and fleet management module 115 may determine if there are any vehicles having been selected in step 434, i.e., the selected list of vehicles meeting the transportation request service type and availability criteria and within a first proximity distance selected in step 434 is non-zero. If there are no such vehicles within a first proximity distance, process 430 may proceed to step 438 where a check may be made to determine if the last selected list of vehicles was determined using a maximum proximity distance (i.e., a proximity distance at or exceeding a proximity distance limit, i.e. data field proximity_distance_limit 396), wherein a proximity distance limit may be used to limit a service response time or other such service related metric in response to a transportation request. For example, a service metric of transportation network platform 100 may be that confirmed transportation requests should receive a vehicle arrival for pickup within 5 minutes (or 6 minutes, or 7 minutes, or 8.5 minutes, or 4 minutes, etc.). In some implementations, such metrics (and associated values such as proximity distance limits) may be established and/or predetermined by geographical zones, postal zones (e.g. zip codes), venues, specific locations, etc. If a maximum proximity distance was used as a selection criteria in step 434, process 430 may proceed from step 438 to step 442, wherein in some implementations, a transportation request may be considered outside of a currently serviceable area and an exception handling process may be initiated to attempt to resolve a lack of service availability. For example, such an exception handling process may include proposing alternative service types to customer 102, wherein such alternate service types may be within a current service area of customer 102. In some implementations, an exception handling process may consider one or more vehicles which may become available within a time delay, such as vehicles that are currently engaged in vehicle assignments, but are nearing completion of such vehicle assignments in the vicinity of customer 102. In the aforementioned latter exception handling process, a delayed pickup time may be proposed to customer 102. In some implementations, customer 102 may be offered a choice of an alternate service type, or a delayed pickup time comprising their transportation request service type.

If in step 438, a check determines that a maximum proximity distance was not used as a selection criteria for the selection list selected in step 434, process 430 may proceed from step 438 to step 440, wherein a next selection of available vehicles may be made. In step 440, vehicle assignment and fleet management module 115 may in conjunction with data services 111a select from driver-vehicle table 360 of database(s) 111b a list of vehicles of driver-vehicle records associated with driver-vehicle ids 361 which satisfy a transportation request service (e.g. veh_service_type(service_id) 365 is the same as service_quote(service_id) 316), have an availability for assignment as indicated by vehicle_availability 366 and have a location as indicated by vehicle_location(location_id) 367, wherein such location is within a next greater proximity distance (having a proximity distance greater than the previous proximity distance used as a selection criteria) of a transportation request pickup location as indicated by pickup_loc_quote(location_id) 311 of a given transportation record of transportation table 300 associated with transportation_id 301 for which a vehicle assignment is being created. In some implementations a next greater proximity distance may be calculated by incrementing a last used proximity distance by a distance increment, i.e. data field proximity_distance_increment 397 (of incremental liner distance, route distance, time distance, etc.) and a resulting next proximity distance may be used as is or may be capped not to exceed a proximity distance limit, i.e. data field proximity_distance_limit 396. In some implementations, a distance increment may be established and/or predetermined by geographical zones, postal zones (e.g. zip codes), venues, specific locations, etc. In some implementations a next proximity distance may not be capped and may be used as is, wherein a distance increment may not result in an excessive impact of a service metric (e.g. a vehicle may not exceed a service metric response time to a customer pickup by more than a minute, or two minutes, or 30 seconds, etc.). Following a next selection of available vehicles in step 440, process 430 proceeds to step 436 for a second entry into step 436.

In a next entry into step 436, vehicle assignment and fleet management module 115 may determine if there are any vehicles within a next proximity distance (i.e., the selected list of vehicles from step 440 is non-zero). If there are no vehicles within a next proximity distance, process 430 may proceed to step 438 where a check may again be made to determine if the last selection list was determined using a maximum proximity distance (i.e., a proximity distance at or exceeding a proximity distance limit) was used as a selection criteria for the selection list selected in step 440. If a maximum proximity distance was used, process 430 may proceed from step 438 to step 442, wherein in some implementations, a transportation request may be considered outside of a current serviceable area and, an exception handling process as discussed earlier herein may be initiated to attempt to resolve lack of service availability.

If in step 438, a maximum proximity distance was not used as a selection criteria for the selection list selected in step 440, process 430 may repeat and again proceed from step 438 to step 440, wherein a next selection of available vehicle may again be made, wherein vehicle assignment and fleet management module 115 may in conjunction with data services 111a select from driver-vehicle table 360 of database(s) 111b a list of vehicles of driver-vehicle records associated with driver-vehicle ids 361 which meet a transportation request service (e.g. veh_service_type(service_id) 365 meets service_quote(service_id) 316), have an availability for assignment as indicated by vehicle availability 366 and have a location as indicated by vehicle_location (location_id) 367, wherein such location is within a next greater proximity distance (having a proximity distance greater than the previous proximity distance used as a selection criteria) of a transportation request pickup location as indicated by pickup_loc_quote(location_id) 311 of a given transportation record of transportation table 300 associated with transportation_id 301 for which a vehicle assignment is being created. Process 430 repeats steps 438, 440 and 436 until at least one vehicle is selected within a proximity distance in step 436, or no vehicles are selected prior to a determination of a maximum proximity distance in step 438.

If in step 436, one or more vehicles are in proximity (i.e., the selected list of vehicles from step 440 or step 434 is non-zero), process 430 proceeds from step 436 to step 444. In step 444, vehicles from a most recent list of vehicles selected in step 434 or step 440 are assessed in a qualification process to determine if they have a sufficient vehicle range to fulfill the transportation request for which a vehicle assignment is being created, and if so, may be qualified for such assignment. An example process of determining if a vehicle comprises a sufficient range to fulfill a transportation request, also referred to herein as a "qualification" process 500 is depicted in FIG. 5A and will be described later herein.

If in step 446, no vehicles are qualified for assignment to the transportation request, process 430 proceeds to step 438, wherein a check may be made to determine if the last selection list was determined using a maximum proximity distance. If a maximum proximity distance was used, process 430 may proceed from step 438 to step 442, wherein in some implementations, a transportation request may be considered outside of a current serviceable area and, an exception handling process as discussed earlier herein may be initiated to attempt to resolve a lack of service availability.

Figure 5A:
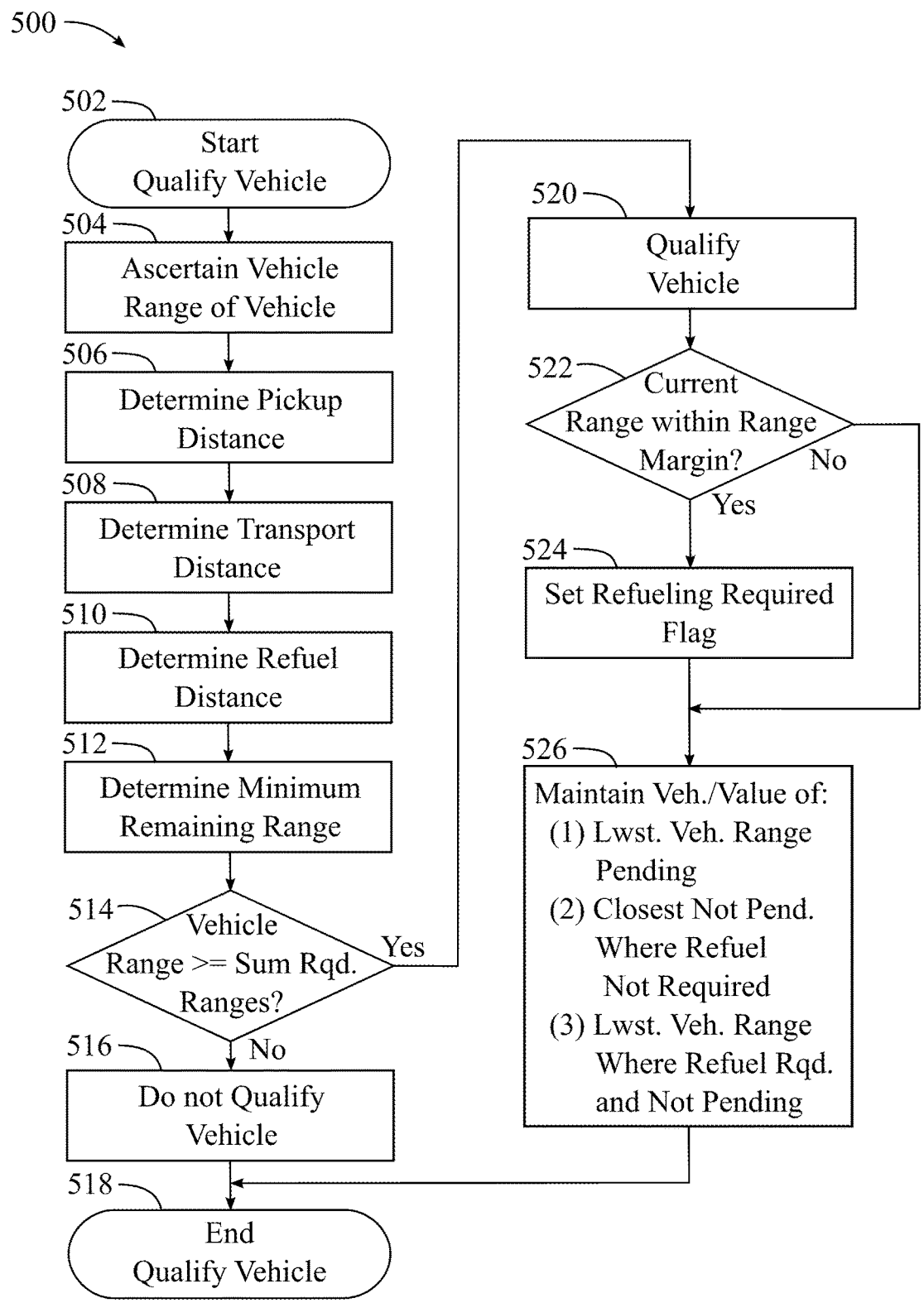
FIG. 5A depicts a flow diagram of an example process of determining if a vehicle comprises a sufficient range to fulfill a transportation request, also referred to herein as "qualifying a vehicle", for a vehicle assignment to the transportation request.

FIG. 5A depicts a flow diagram of an example process of qualifying a vehicle for a vehicle assignment to a transportation request and may correspond to step 444 of FIG. 4B, wherein a qualification determination may be made for vehicles of a last selection list selected in step 434 or step 440. Such a determination for multiple vehicles (i.e., a selection list greater than one) can be made by process 500 being run for each vehicle in a selection list. In some implementations, a refueling need may be presumably determined to not exist where a transport distance 264 (see FIG. 2B) does not exceed a given maximum transport distance such that a sum distance 272 (see FIG. 2C) may be presumed to be below a given maximum sum distance, and where a vehicle range is above a given safe vehicle range such that a safe margin may be presumed, then vehicle range may be presumed to be above a range margin 274 and in a surplus range 276 (see FIG. 2C). In such implementations, a vehicle may be qualified as having sufficient range to fulfill a transportation service event and not require refueling based on having a vehicle range above a given safe vehicle range in view of a transport distance that is below a given maximum transport distance, where process 500 may not be needed for a qualification determination of such a vehicle.

In some implementations, process 500 may be run in a loop until all vehicles of a selected list which require a qualification assessment are processed. In some implementations, a process for qualifying vehicles may be implemented comprising matrix operations where a plurality of vehicles may be processed at least in part as a group in one or more operations. Such a process comprising matrix operations may be implemented to have a same result as running process 500 a plurality of times for a plurality of vehicles. Such a process comprising matrix operations may have a faster (shorter) processing time for a selection list of vehicles as the collective time required to run process 500 for each vehicle comprised by the selection list of vehicles.

Process 500 may being in step 502 for a vehicle comprised by a last selection list and proceed to step 504, wherein a vehicle range for the vehicle is ascertained. In some implementations, a vehicle range may be maintained in driver-vehicle table 360, data field range_status 369. Range_status 369 may be maintained using one or more different methods, such as a periodic request sent to ground vehicle subsystem 140a or air vehicle subsystem 150a by vehicle assignment and fleet management module 115, wherein a range status is requested, wherein such a subsystem may report an estimated vehicle range, or a fuel status, such as data field fuel_status 368 which may then be associated to an estimated vehicle range based on a conversion factor, such as data field fuel_range_conversion 370 which may relate a fuel status (e.g. fuel level) to a vehicle range. A plurality of such conversion factors may be maintained for a plurality of vehicle models and/or types and driving/flying conditions, and used as appropriate to achieve an estimate of a vehicle range. In some implementations, a request for a vehicle range status may be sent to a driver device 130 or 130a, wherein a driver 103 or 103a may report therewith an estimated vehicle range and/or fuel status which may be associated to an estimated vehicle range. In some implementations, a driver (pilot) may capture one or more images of one or more vehicle gauges in response to a request for a vehicle range status, wherein a driver device 130 or 130a may be used to capture and send one or more images, such an image of a fuel gauge or a range reading, to transportation network platform 100, wherein transportation network platform 100 may comprise image processing configured to determine an estimated vehicle range from the one or more images. In some implementations, a periodic unsolicited reporting of a range status and/or fuel status may be sent by ground vehicle subsystem 140a or air vehicle subsystem 150a. In some implementations, a triggered unsolicited reporting of a range status and/or fuel status may be sent by ground vehicle subsystem 140a or air vehicle subsystem 150a, wherein a change is such a status triggers a reporting. In some implementations, reporting of GPS locations of a vehicle (via subsystem 140a or 150a and/or driver device 130 or 130a) may be used to determine movements of a vehicle which may be usable to update a last reporting of a range status and/or fuel status. For example, a last reported range status may indicate a range of 100 miles, and a series of GPS locations subsequently reported may indicate 8.4 miles have been driven since the last reported range status of 100 miles, and as a result an estimated range status of 91.6 miles may be calculated and used as an ascertained range of vehicle in step 504. In some implementations, a series of reported GPS locations and periodic reports of fuel status may be used at least in part to maintain and improve an accuracy of conversion factors usable to convert a fuel amount/capacity to a range amount/capacity.

In step 506, a distance needed for a vehicle being processed in process 500 to travel a route distance between a vehicle location and a quoted pickup location may be determined, wherein such needed range to travel such route distance may be called a pickup distance 262 (see FIG. 2B). To determine a needed distance 262, vehicle assignment and fleet management module 115 may call route analysis and infrastructure management module 116 to determine a route and associated route distance between a vehicle location as may be given in a data field d-v loc(location_id) 367 associated with such vehicle being processed and a pickup location as may be given in data field pickup_loc_quote (location_id) 311. In step 508, a distance needed to travel from a pickup location to a destination location, which may be called a transport distance 264 (see FIG. 2B) may be determined. Such a needed transport distance 264 may be a distance of a route associated with data field route(route_id) 309 of transportation table 300 and may be a distance between a quoted pickup location as may be given in data field pickup_loc_quote(location_id) 311 and a quoted destination as may be given in a data field dest_quote(location_id) 313.

In some implementations where a refueling event may be planned in conjunction with a vehicle assignment, in step 510, a range needed to for a vehicle being processed in process 500 to travel a route distance between a destination location and a fueling unit location may be determined, wherein such needed range to travel such route distance may be called a refuel distance 266 (see FIG. 2B). To determine a needed refuel distance 266, vehicle assignment and fleet management module 115 may call route analysis and infrastructure management module 116 to determine a fuel unit having a location as may be given by data field fuel_unit_loc (location_id) 382 in a proximity to a quoted destination as may be given in a data field dest_quote(location_id) 313, wherein a fuel service provided by such a fuel unit match a fuel service required by a vehicle as may be specified in data field fuel type 364. In some implementations, a fuel unit meeting the aforementioned criteria of fuel type and services and proximity criteria, and also meeting an availability status criteria which may be given as "fuel unit available" as specified in a data field fuel_unit(status_code_id), may be used to determine a refuel distance 266. In some implementations, a fuel unit meeting the aforementioned criteria of fuel type and services, proximity criteria and availability status criteria may be used to determine a refuel distance 266. In some implementations, a driver or vehicle operator may specify a preferred fuel unit and/or operator of fuel units. For example a driver or vehicle operator may have a relationship with, or preference for, a particular brand of fuel service or may prefer a fuel unit of a specified location, and may have indicated a preference accordingly in a data fuel pref_fuel_unit(fueling_unit_id) 371, wherein route analysis and infrastructure management module 116 may give preference to such a fuel unit preference when determining a refuel distance 266, provided a distance penalty incurred may not be too great (e.g., may be within a given maximum added distance to fuel unit otherwise meeting criteria and/or within a predetermined distance).

In step 512, a minimum remaining range required 267 (see FIG. 2B) may be ascertained as may be given by a data field min_rmng_range 395, wherein a minimum remaining range required may be associated to a geographic location and/or a time and/or day as given in data fields geographic_zone(location_id) 392 and time day(day_part_id) 393, such that a vehicle location, quoted pickup location and/or quoted destination location may be used at least in part and/or a current time and/or current day may be used at least in part to ascertain a minimum remaining range required.

In step 514, if a vehicle range is greater than or equal to a sum of the required distances and ranges (which may be referred to as a "sum distance" herein), then the process proceeds to step 520, wherein a vehicle is qualified, and if a vehicle range is not greater than or equal to a sum of the required distances and ranges, i.e., the sum distance exceeds the vehicle range, then the process proceeds to step 516, wherein a vehicle is not qualified, as shown in Conditional Statement 3 below:

| CONDITIONAL STATEMENT 3 | |
|---|---|
| (In step 514) | IF (vehicle_range >= (pickup_distance + transport_distance + refuel_distance + minimum_remaining_range)); |

| CONDITIONAL STATEMENT 3 | |
|---|---|
| (In step 520) | THEN vehicle is qualified; |
| (In step 516) | ELSE vehicle is not qualified | where, for above Conditional Statement 3:
vehicle_range is a range of a vehicle;
pickup_distance is a distance of travel from a vehicle location to a pickup location;
transport_distance is a distance of travel from a pickup location to a destination location;
refuel_distance is a distance of travel from a destination location to a fuel unit location; and
minimum_remaining_range is a minimum remaining range a vehicle is required to have following completion of a transportation service event (which may or may not include a refueling event), wherein:
  in some implementations, a condition of greater than (i.e. ">") may be used instead of greater than or equal (i.e. ">=");
  in some implementations, a condition of greater than or approximately equal to may be used instead of greater than or equal; and
  as noted earlier herein, in some implementations a sum distance may not comprise a refuel_distance, wherein refueling events are not scheduled, and in some implementations a sum distance may not comprise a minimum_remaining_range, and as such, refuel_distance and/or minimum_remaining_range may not be present in Conditional Statement 3 as given above.

Following a not qualifying of a vehicle in step 516, process 500 ends in step 518. Following a qualifying of a vehicle in step 520 process proceeds to step 522, wherein a determination is made as to if a vehicle range is within a range margin 274 (see FIG. 2B) and a refueling event is required 284. If a vehicle range is within a range margin and a refueling event is required, process 500 proceeds to step 524, wherein a vehicle is flagged as requiring a refueling related to a potential tentative assignment, and should the vehicle be assigned, a refueling event may be planned in conjunction with such assignment. Process 500 then proceeds to step 526. If in step 522, a vehicle range is not within a range margin and a refueling event is required, process 500 proceeds to step 526.

In step 526, process 500 may, for the current selection list of vehicles being processed by repeated execution thereof, maintain a list of those vehicles within certain determinations, such as refueling required or not required, already pending refueling, etc., which have edge case values within those certain determinations, such as a lowest vehicle range or closest distance to the pickup location and/or earliest estimated arrival time to the pickup location, etc., namely: 1) a vehicle that already has a pending refueling scheduled prior to a current qualification process that has a lowest vehicle range, 2) a vehicle that does not require refueling and does not already have a pending refueling scheduled that is closest to the pickup location and/or has the earliest estimated arrival time to the pickup location, and 3) a vehicle that does not already have a pending refueling scheduled, that requires refueling and that has a lowest vehicle range. Maintaining such a list of vehicles within certain determinations and edge cases therein may be used in a subsequent assignment step as will be discussed in conjunction with process 430. Following step 526, process 500 proceeds to step 518, wherein process 500 ends. As noted earlier, process 500 may repeat until all vehicles in a selection list are processed thereby.

Returning to process 430 of FIG. 4B, in step 446, if any vehicles were qualified in step 444 (and process 500 associated therewith), process 430 proceeds to step 448, wherein a check is made to determine if all vehicles qualified have an outstanding pending refueling scheduled from a prior assignment. In order to discourage drivers and vehicle operators from deliberately maintaining a low vehicle range level and within a range margin 274 (see FIG. 2B) in order to get favorable priority in vehicle assignments, a vehicle which has an outstanding refueling event that has not been satisfied from a prior assignment, will receive lowest priority in selection for new assignments. As such, in step 448, only where all vehicles qualified already have pending refueling events, may process 430 proceed to step 450, wherein one such vehicle may be tentatively assigned, wherein the vehicle having the lowest vehicle range relative to any other qualified vehicles which have pending refueling events may so be tentatively assigned, thereby reducing a probability that a vehicle presently engaged in providing services will become unavailable to provide such services due to fuel depletion. In some implementations, where a preference is given to customer response time rather than favor a vehicle which has not satisfied a pending refueling event, a tentative assignment may be made to a vehicle closest to a pickup location and/or that has an earliest estimated arrival time to a pickup location among those vehicles having not satisfied a pending refueling event.

If in step 448, any qualified vehicles are not already pending a refueling event, process 430 proceeds to step 452, wherein a check is made to determine if any vehicles that are not pending a refuel event require refueling, and if so, process 430 proceeds to step 456, wherein one such vehicle having the lowest vehicle range, i.e., the greatest refueling need, may be tentatively assigned. If in step 452, no vehicles are found to require refueling that that do not have an outstanding pending refueling event, then process 430 proceeds to step 454, wherein a vehicle closest to a pickup location and/or that has an earliest estimated arrival time to a pickup location among those not pending and not requiring refueling, may be tentatively assigned. In some implementations, where a quoted pickup time (i.e. pickup_time_quote 312) does not require an earliest estimated time of arrival, a shorter distance or other such criteria may dictate which vehicle among those not pending and not requiring refueling be assigned.

Following steps 450, 456 and 454, where in each of such steps a tentative vehicle assignment is made, process 430 then proceeds to step 458, wherein in some implementations an acceptance timer is started, and process 430 proceeds to step 460, wherein a check is made to determine if a tentative vehicle assignment is accepted prior to an expiration of an acceptance timer. In some implementations, acceptance may be presumed (i.e., an assignment is not first made tentative) and an explicit rejection may be required should a vehicle and/or driver be unwilling or unable to accept an assignment. If a tentative assignment is accepted prior to an expiration of an acceptance timer is step 460, process 430 proceeds to step 462 wherein a vehicle assignment may be created. In step 462, a transportation service event status code, as may be specified in data field tran_srvc_evnt (status_code_id) 315 may be set to status code 03, "vehicle assigned" and a vehicle identifier identifying the assigned vehicle may be written to the associated transportation record of the transportation request, namely data field d-v-(driver-vehicle_id) 316. In step 462, in the case where a tentative refueling event was planned in step 456, a refueling event may be planned in conjunction with a vehicle assignment, wherein a refueling event status code, as may be specified in data field refuel_evnt(status_code_id) 372 may be set to status code 61, "scheduled refueling event pending". Following step 462, process 430 may proceed to step 464, wherein process 430 ends.

In step 460, if an acceptance timer has expired prior to an acceptance of a tentative vehicle assignment, then process 430 proceeds to step 466, wherein a vehicle for which a tentative vehicle assignment has expired, is removed from further consideration regarding the current transportation request for which a vehicle assignment is being created in process 430, and process 430 proceeds to step 434, wherein process 430 repeats a selection step 434.

Figure 5B:
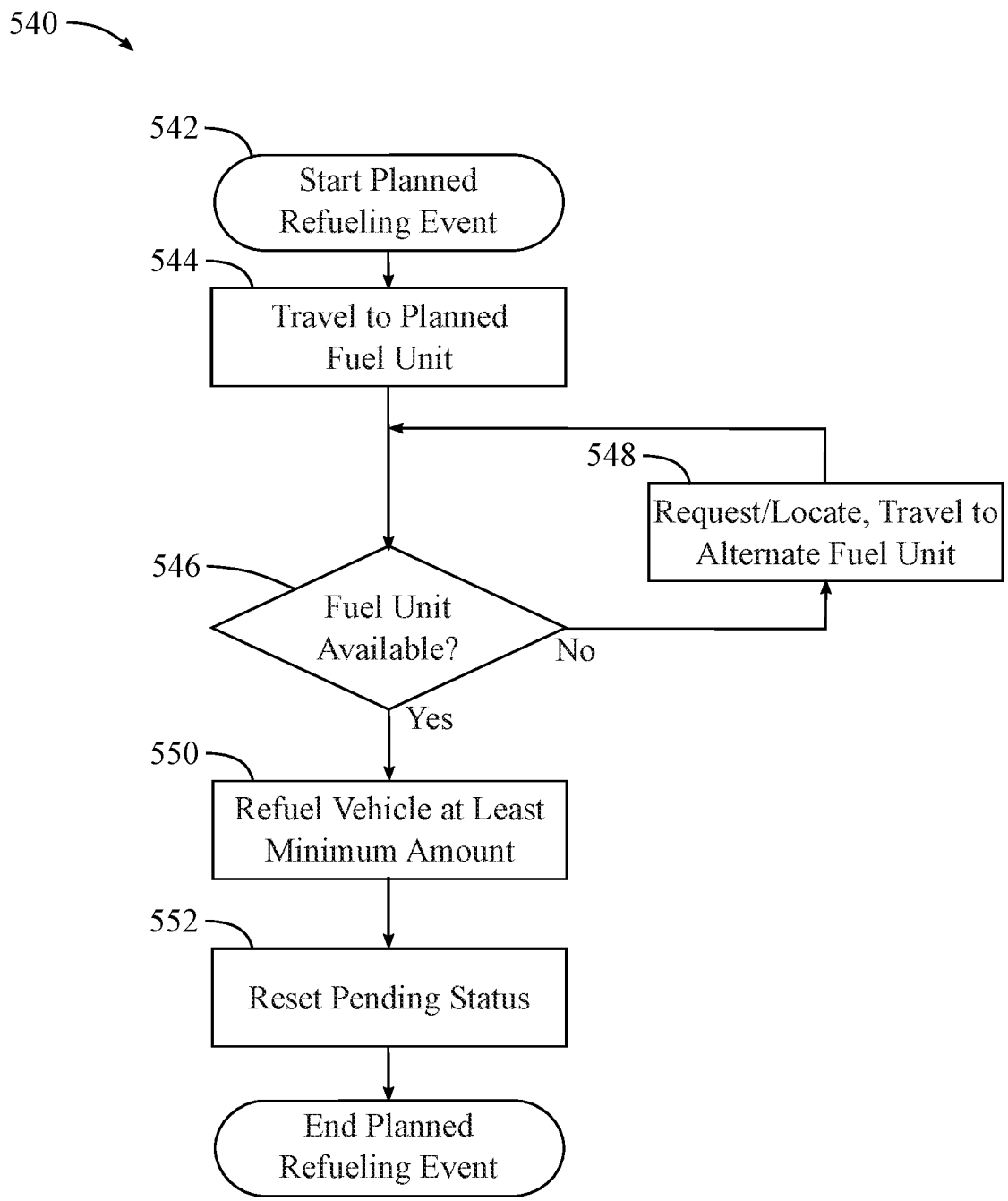
FIG. 5B depicts a flow diagram of an example process of a planned refueling event.

FIG. 5B depicts a flow diagram of an example process 540 of a planned refueling event, such as a refueling event corresponding to step 224 of FIG. 2A, wherein a vehicle may be refueled. Process 540 may begin in step 542, start planned refueling event. Process 540 proceeds to step 544, wherein a vehicle associated with the planned refueling event may travel to a fuel unit which may be specified for use in a refueling event as recorded in a data field refuel_evnt_plan(fuel_unit_id) 320. In step 546, if a fuel unit planned for a refueling event is not available, process 540 may proceed to step 548, wherein an alternate fuel unit may be requested and/or located and traveled thereto, and process 540 may proceed back to step 546. If in step 546, a fuel unit is available, process 530 may proceed to step 550, wherein a vehicle may be refueled by at least a minimum specified refueling amount, such as may be specified in a data field refuel_amount_min 321. Process 540 may proceed to step 552, wherein a refueling event status code, as may be specified in data field refuel evnt(status_code_id) 372 may be reset to status code 60, "scheduled refueling event not pending/prior scheduled refueling event satisfied".

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of transportation network platforms and systems and methods for assigning vehicles to transportation requests have been described. Various modifications may be made without departing from the spirit and scope of the invention.

What is claimed is:

1. A system for assigning a vehicle to a transportation request and initiating servicing of the transportation request by the vehicle, the system comprising:
   one or more servers comprising one or more processors and configured to communicate over a communications network;
   a plurality of vehicles, wherein each vehicle comprises:
      a vehicle subsystem comprising vehicle subsystem logic comprising instructions and one or more processors configured to execute instructions of the vehicle subsystem logic and communicate a vehicle status; and
      a driver device having an interface configured to accept tactile input from the driver and disposed in at least one vehicle, wherein at least one of said vehicle subsystem or said driver device has geo location services wherein at least one of said driver device or said vehicle subsystem is configured to communicate a vehicle status comprising a vehicle location provided by the geo location services thereof over the communications network to the one or more servers;
   a plurality of customer devices, wherein each customer device comprises a user interface operable by a user of the customer device, geo location services, customer application logic comprising instructions and one or more processors configured to execute instructions of the customer application logic and communicate over the communications network and interact with the one or more servers, thereby enabling a customer using the customer device to interact with the one or more servers to create a transportation request comprising a pickup location and a destination location, wherein the one or more servers are further configured to:
      receive from a first vehicle subsystem or said driver device, a first vehicle status of a first vehicle, wherein the first vehicle status comprises a first location of the first vehicle and a first value relating a first range of the first vehicle;
      determine that the first vehicle of said plurality of vehicles comprises a sufficient range to fulfill the transportation request, wherein the determination is based at least in part on the range being greater than a sum of distances based upon:
         the first location of the first vehicle;
         the first value relating the first range of the first vehicle;
         the pickup location of the transportation request;
         the destination location of the transportation request; and
         a refueling distance, wherein the refueling distance is a distance from the destination location to a location of a fuel unit or charging station comprising services which meet a service criterion of the first vehicle;
   wherein in response to receiving a transportation request, creating a priority based vehicle assignment by assigning the first vehicle to the transportation request based on a plurality of determinations comprising:
      1) a vehicle that already has a pending refueling scheduled prior to a current qualification process and that has a lowest vehicle range,
      2) a vehicle that does not require refueling and does not already have a pending refueling scheduled that is closest to the pickup location and/or has the earliest estimated arrival time to the pickup location, and
      3) a vehicle that does not already have a pending refueling scheduled, that requires refueling and that has a lowest vehicle range;
   selecting the first vehicle based upon said determinations;
      initiate travel of the first vehicle to the pickup location to service the transportation request, wherein the servicing of the transportation request does not comprise a refueling event of the first vehicle prior to it reaching the destination wherein at least one of said one or more servers and at least one of said driver device or said vehicle subsystem and at least one of said customer devices communicate with each other, wherein said communication dynamically updates data shared between at least one of said one or more servers and at least one of said driver device or said vehicle subsystem and said plurality of customer devices.

2. The system of claim 1, wherein the first vehicle is determined to comprise a sufficient range to fulfill the transportation request due to a sum distance not exceeding the first range of the first vehicle, wherein the sum distance comprises a distance from the first location of the first vehicle to the pickup location of the transportation request, a distance from the pickup location of the transportation request to the destination location of the transportation request, and the refueling distance.

3. The system of claim 2, wherein the sum distance further comprises a predetermined remaining minimum range distance.

4. The system of claim 3, wherein the one or more servers are further configured to determine that the first vehicle requires refueling.

5. The system of claim 4, wherein the first vehicle is determined to comprise a sufficient range to fulfill the transportation request and to require refueling due to the first vehicle range being between the sum distance and the sum distance plus a predetermined range margin.

6. The system of claim 5, wherein the sum distance further comprises a predetermined remaining minimum range distance.

7. The system of claim 5, wherein the one or more servers are further configured to:
receive from a second vehicle subsystem, a second vehicle status of a second vehicle associated thereto, wherein the second vehicle status comprises a second location of the second vehicle and a second value relating a second range of the second vehicle;
determine that the second vehicle comprises a sufficient range to fulfill the transportation request, wherein the determination is based at least in part on:
the second location of the second vehicle;
the second value relating the second range of the second vehicle;
the pickup location of the transportation request;
the destination location of the transportation request; and
a refueling distance, wherein the refueling distance is a distance from the destination location to a location of a fuel unit or charging station comprising services which meet a service criterion of the second vehicle; and
determine that the second vehicle requires refueling;
determine that the first vehicle and the second vehicle refueling do not already have a refueling event pending; and
determine that the first range of the first vehicle is less than the second range of the second vehicle, wherein the first vehicle being assigned to the transportation request is due at least in part to the first range of the first vehicle being less than the second range of the second vehicle.

8. The system of claim 7, wherein the one or more servers are further configured to schedule the first vehicle for a refueling event.

9. The system of claim 1, wherein the one or more servers are further configured to:
receive from a second vehicle subsystem, a second vehicle status of a second vehicle associated thereto, wherein the second vehicle status comprises a second location of the second vehicle and a second value relating a second range of the second vehicle;
determine that the second vehicle comprises a sufficient range to fulfill the transportation request, wherein the determination is based at least in part on:
the second location of the second vehicle;
the second value relating the second range of the second vehicle;
the pickup location of the transportation request;
the destination location of the transportation request; and
a refueling distance, wherein the refueling distance is a distance from the destination location to a location of a fuel unit or charging station comprising services which meet a service criterion of the second vehicle; and
determine that the first vehicle and the second vehicle do not require refueling, wherein the first vehicle is assigned to the transportation request due at least in part to the first vehicle having a shorter distance from the first location of the first vehicle location to the pickup location of the transportation request than the distance from the second location of the second vehicle to the pickup location of the transportation request.

10. The system of claim 1, wherein vehicles associated with the plurality of vehicle subsystems comprise ground vehicles.

11. The system of claim 1, wherein plurality of vehicles comprise electric vehicles.

12. The system of claim 1, further comprising:
one or more databases accessible by the one or more servers, wherein the one or more databases comprise:
a plurality of transportation requests;
a plurality of vehicle records, wherein each vehicle record comprises a vehicle identifier associated with a vehicle; and
a plurality of vehicle assignments, wherein each vehicle assignment comprises an identifier associating a vehicle to a transportation request, wherein upon assigning a vehicle to a transportation request, the one or more servers are further configured to write to the one or more databases an identifier associating the vehicle to the transportation request.

13. A method for assigning a vehicle to a transportation request and initiating servicing of the transportation request by the vehicle, the method comprising:
providing a system comprising:
one or more servers comprising one or more processors and configured to communicate over a communications network;
a plurality of vehicles, wherein each vehicle comprises a vehicle subsystem comprising geo location services, vehicle subsystem logic comprising instructions and one or more processors configured to execute instructions of the vehicle subsystem logic; and
a driver device, disposed in the vehicle and having an interface configured to accept tactile input from the driver wherein at least one of said vehicle subsystem or said driver device has geo location services wherein at least one of said driver device or said vehicle subsystem is configured to communicate a vehicle status comprising a vehicle location provided by the geo location services thereof over the communications network to the one or more servers; and a plurality of customer devices, wherein each customer device comprises a user interface operable by a user of the customer device, geo location services, customer application logic comprising instructions and one or more processors configured to execute instructions of the customer application logic and communicate over the communications network and interact with the one or more servers, thereby enabling a customer using the customer device to interact with the one or more servers to create a transportation request;

receiving from vehicle subsystem, a vehicle status of a vehicle comprising the vehicle subsystem, wherein the vehicle status comprises a location of the vehicle and a value relating a range of the vehicle;

receiving from a customer device, a transportation request comprising a pickup location and a destination location;

determining, in response to the received transportation request, for each of the vehicles associated to the received vehicle statuses a range for each vehicle the range being greater than a sum of distances based upon:
a sum distance comprising:
a travel distance from a vehicle location to the pickup location;
a travel distance from the pickup location to the destination location; and
a refueling distance, wherein the refueling distance is a distance from the destination location to a location of a fuel unit or charging station comprising services which meet a service criterion of the vehicle; and
the vehicle has sufficient range to fulfill the transportation request, wherein the vehicle has sufficient range if the sum distance does not exceed the range of the vehicle;

determining that a first vehicle has sufficient range to fulfill the transportation request; a plurality of determinations comprising:
1) a vehicle that already has a pending refueling scheduled prior to a current qualification process and that has a lowest vehicle range,
2) a vehicle that does not require refueling and does not already have a pending refueling scheduled that is closest to the pickup location and/or has the earliest estimated arrival time to the pickup location, and
3) a vehicle that does not already have a pending refueling scheduled, that requires refueling and that has a lowest vehicle range;

selecting the first vehicle based upon said determinations;

creating a vehicle assignment assigning the first vehicle to the transportation request;

initiating travel of the first vehicle to the pickup location to service the transportation request, wherein the servicing of the transportation request does not comprise a refueling event of the first vehicle prior to it reaching the destination wherein at least one of said one or more servers and at least one of said driver device or said vehicle subsystem and at least one of said customer devices communicate in real time with each other, wherein said communication dynamically updates data shared between at least one of said one or more servers and at least one of said driver device or said vehicle subsystem and said plurality of customer devices.

14. The method of claim 13, the method further comprising:
providing a system further comprising:
one or more databases accessible by the one or more servers, wherein the one or more databases comprise:
a plurality of transportation requests, wherein each transportation request comprises a pickup location and a destination location;
a plurality of vehicle records, wherein each vehicle record comprises a vehicle identifier associated with a vehicle; and
a plurality of vehicle assignments, wherein each vehicle assignment comprises an identifier associating a vehicle to a transportation request; and
writing to the one or more databases an identifier associating the assigned vehicle to the transportation request.

15. The system of claim 1, wherein the plurality of vehicles comprise air vehicles.

16. The system of claim 1, wherein the plurality of vehicles comprise gasoline vehicles.

17. The system as in claim 1, wherein at least one of the plurality of vehicles comprises an autonomous vehicle.

18. A system for assigning an autonomous vehicle to a transportation request and initiating servicing of the transportation request by the autonomous vehicle, the system comprising:
one or more servers comprising one or more processors and configured to communicate over a communications network;
a plurality of autonomous vehicles, wherein each autonomous vehicle comprises:
a vehicle subsystem comprising geo location services, vehicle subsystem logic comprising instructions and one or more processors configured to execute instructions of the vehicle subsystem logic and communicate a vehicle status comprising a vehicle location provided by the geo location services thereof over the communications network to the one or more servers; and
a plurality of customer devices, wherein each customer device comprises a user interface operable by a user of the customer device, geo location services, customer application logic comprising instructions and one or more processors configured to execute instructions of the customer application logic and communicate over the communications network and interact with the one or more servers, thereby enabling a customer using the customer device to interact with the one or more servers to create a transportation request comprising a pickup location and a destination location, wherein the one or more servers are further configured to:
receive from a first vehicle subsystem, a first vehicle status of a first autonomous vehicle, wherein the first vehicle status comprises a first location (1) of the first autonomous vehicle and a first value relating a first range of the first autonomous vehicle;
determine that the first autonomous vehicle of said plurality of autonomous vehicles comprises a sufficient range to fulfill the transportation request, wherein the determination is based at least in part on:
the first location (1) of the first autonomous vehicle;
the first value relating the first range of the first autonomous vehicle;

the pickup location of the transportation request (2);

the destination location (3) of the transportation request; and a refueling distance, wherein the refueling distance is a distance from the destination location to a location of a fuel unit or charging station (4) comprising services which meet a service criterion of the first autonomous vehicle;

wherein in response to receiving a transportation request creating a priority based vehicle assignment in real time by assigning the first vehicle to the transportation request based at least in part on the following criteria:

1) a vehicle that already has a pending refueling scheduled prior to a current qualification process and that has a lowest vehicle range, 2) a vehicle that does not require refueling and does not already have a pending refueling scheduled that is closest to the pickup location and/or has the earliest estimated arrival time to the pickup location, and 3) a vehicle that does not already have a pending refueling scheduled, that requires refueling and that has a lowest vehicle range;

selecting the first vehicle based upon said determinations;

initiate travel of the first autonomous vehicle to the pickup location to service the transportation request, wherein the servicing of the transportation request does not comprise a refueling event of the first autonomous vehicle prior to it reaching the destination wherein communication occurs in real time, providing dynamic updates to customer devices and to the system via their applications and associated interfaces.

* * * * *